US012613430B2

(12) United States Patent
Hirai et al.

(10) Patent No.: US 12,613,430 B2
(45) Date of Patent: Apr. 28, 2026

(54) LENS ARRAY AND STEREOSCOPIC DISPLAY APPARATUS

(71) Applicant: SONY GROUP CORPORATION, Tokyo (JP)

(72) Inventors: Noriyuki Hirai, Tokyo (JP); Tomoya Yano, Tokyo (JP); Takayuki Kurihara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 333 days.

(21) Appl. No.: 18/262,247

(22) PCT Filed: Jan. 14, 2022

(86) PCT No.: PCT/JP2022/001045
§ 371 (c)(1),
(2) Date: Jul. 20, 2023

(87) PCT Pub. No.: WO2022/163378
PCT Pub. Date: Aug. 4, 2022

(65) Prior Publication Data
US 2024/0310648 A1 Sep. 19, 2024

(30) Foreign Application Priority Data
Jan. 28, 2021 (JP) ................................. 2021-012441

(51) Int. Cl.
*G02B 30/27* (2020.01)
*G02B 3/00* (2006.01)
*H04N 13/305* (2018.01)

(52) U.S. Cl.
CPC ........... *G02B 30/27* (2020.01); *G02B 3/0062* (2013.01); *H04N 13/305* (2018.05)

(58) Field of Classification Search
USPC ......................................................... 359/466
See application file for complete search history.

(56) References Cited

U.S. PATENT DOCUMENTS

| | | | | |
|---|---|---|---|---|
| 5,306,915 A | * | 4/1994 | Matthews | ............. H10F 77/147 |
| | | | | 257/E31.038 |
| 2014/0043681 A1 | * | 2/2014 | Ishii | ........................ G02B 30/27 |
| | | | | 359/463 |
| 2014/0203311 A1 | | 7/2014 | Schowalter et al. | |

FOREIGN PATENT DOCUMENTS

| | | | |
|---|---|---|---|
| JP | 2008-089906 A | 4/2008 | |
| JP | 2008-191325 A | 8/2008 | |

(Continued)

OTHER PUBLICATIONS

International Search Report and Written Opinion of PCT Application No. PCT/JP2022/001045, issued on Mar. 8, 2022, 10 pages of ISRWO.

*Primary Examiner* — Dung T Nguyen
(74) *Attorney, Agent, or Firm* — CHIP LAW GROUP

(57) ABSTRACT
A stereoscopic display apparatus having high display performance independently of a temperature environment is provided. A stereoscopic display apparatus of the present disclosure includes a display panel and a lens array unit. The display panel includes a display surface in which multiple display pixels are arranged. The lens array unit is disposed to be opposed to the display surface of the display panel. The lens array unit includes a stacked structure. The stacked structure includes a resin lens array and a buffer layer. The resin lens array has a first coefficient of thermal expansion within a first range that includes a coefficient of thermal expansion of glass. The buffer layer has a second coefficient of thermal expansion higher than the first coefficient of thermal expansion.

10 Claims, 12 Drawing Sheets

(56)     References Cited

FOREIGN PATENT DOCUMENTS

| | | | |
|---|---|---|---|
| JP | 2013-089898 A | 5/2013 |
| JP | 2014-178701 A | 9/2014 |

* cited by examiner

[ FIG. 1 ]
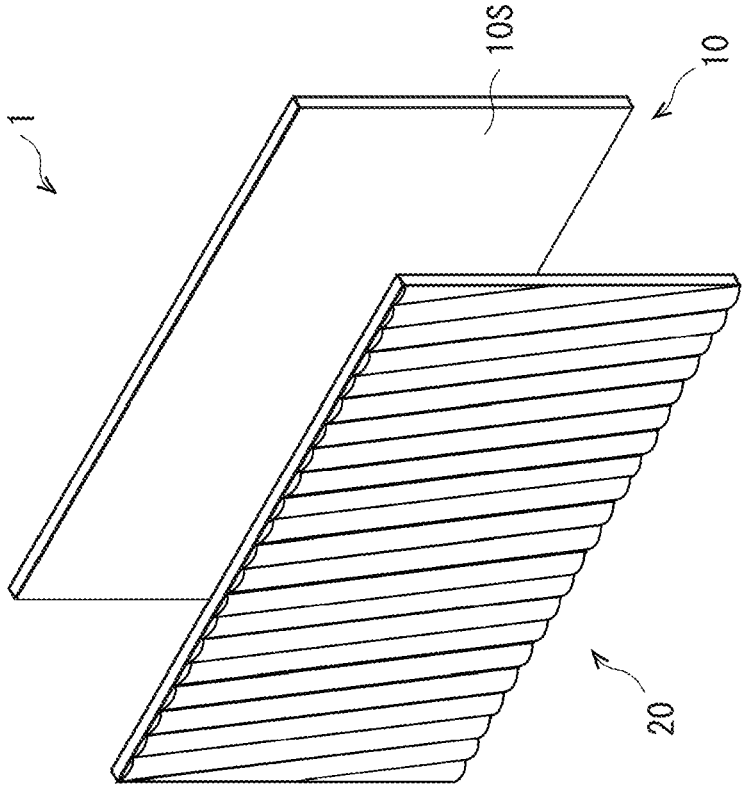
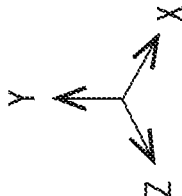

[ FIG. 2 ]
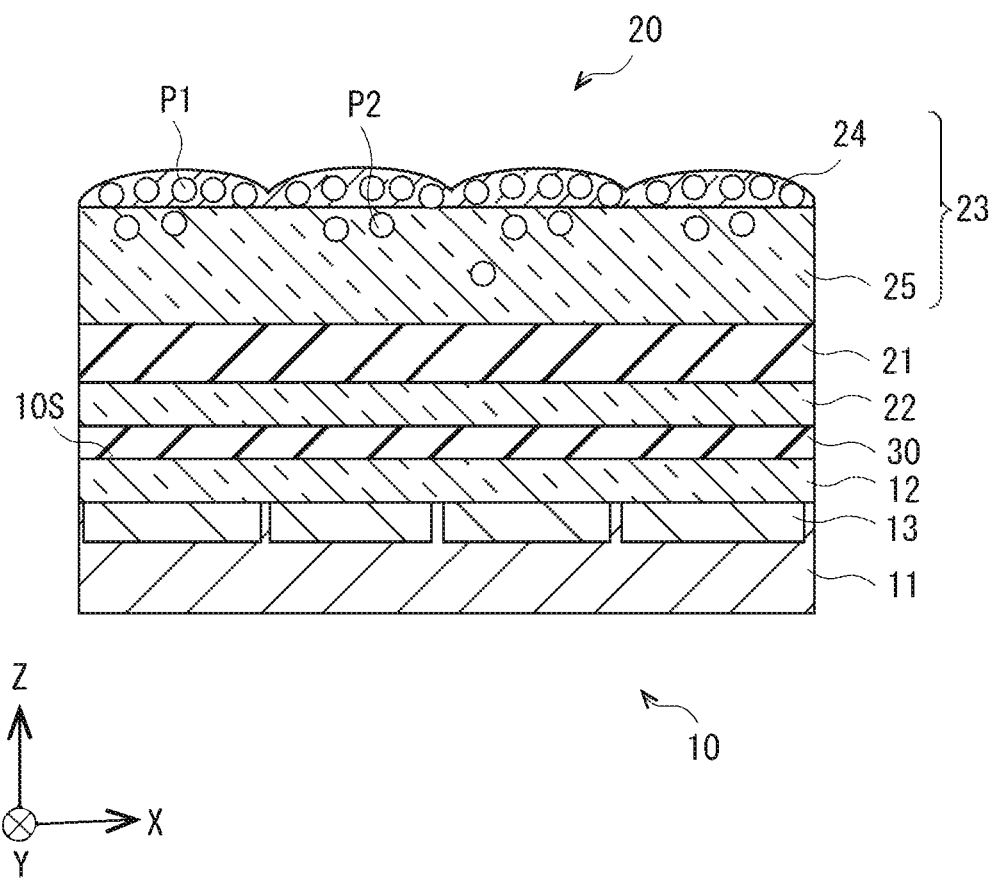

[ FIG. 3 ]
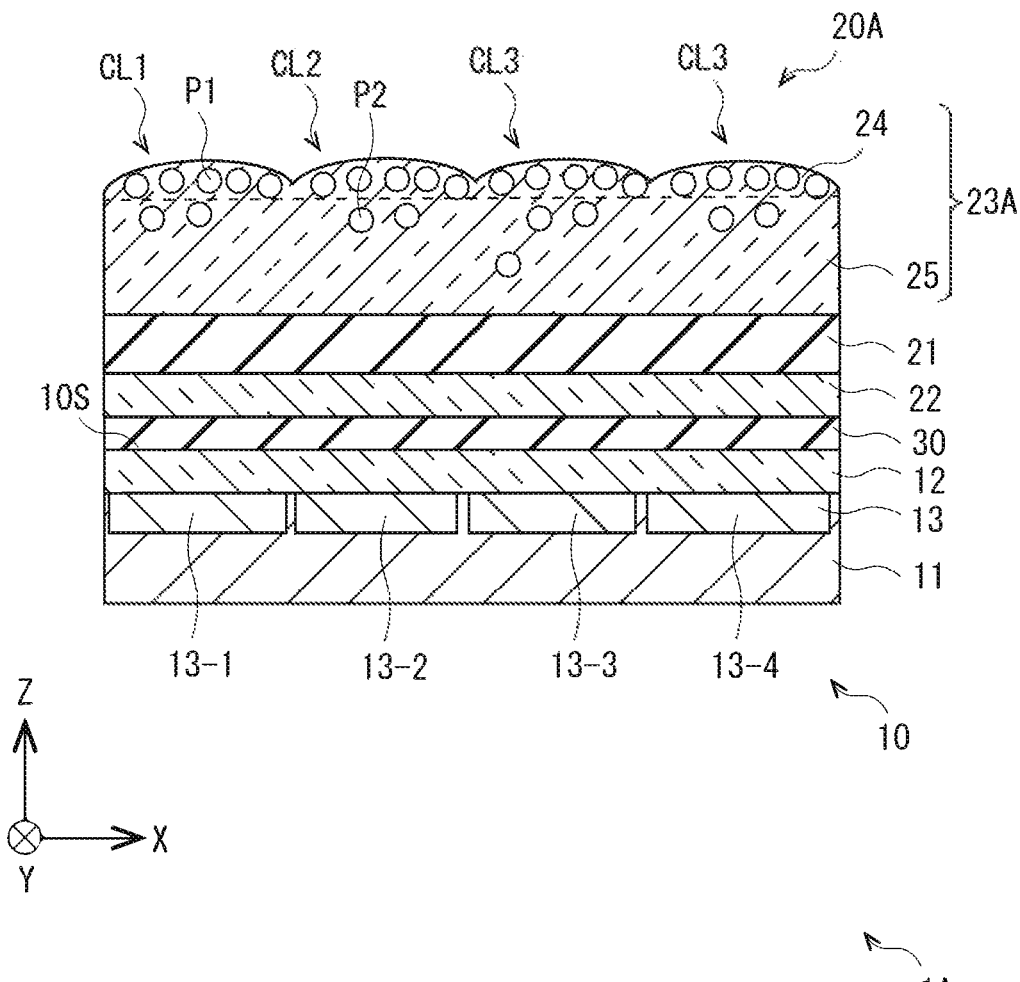

[ FIG. 4 ]
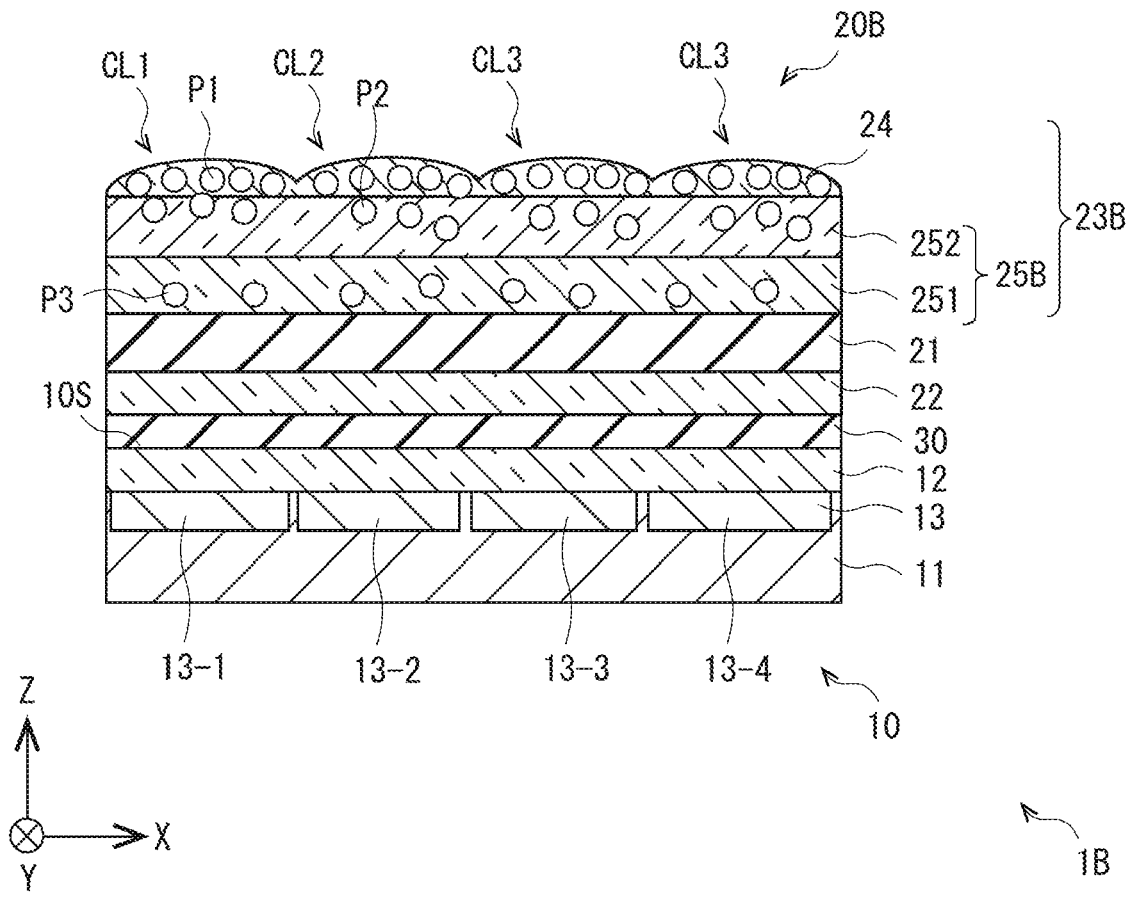

[ FIG. 5 ]
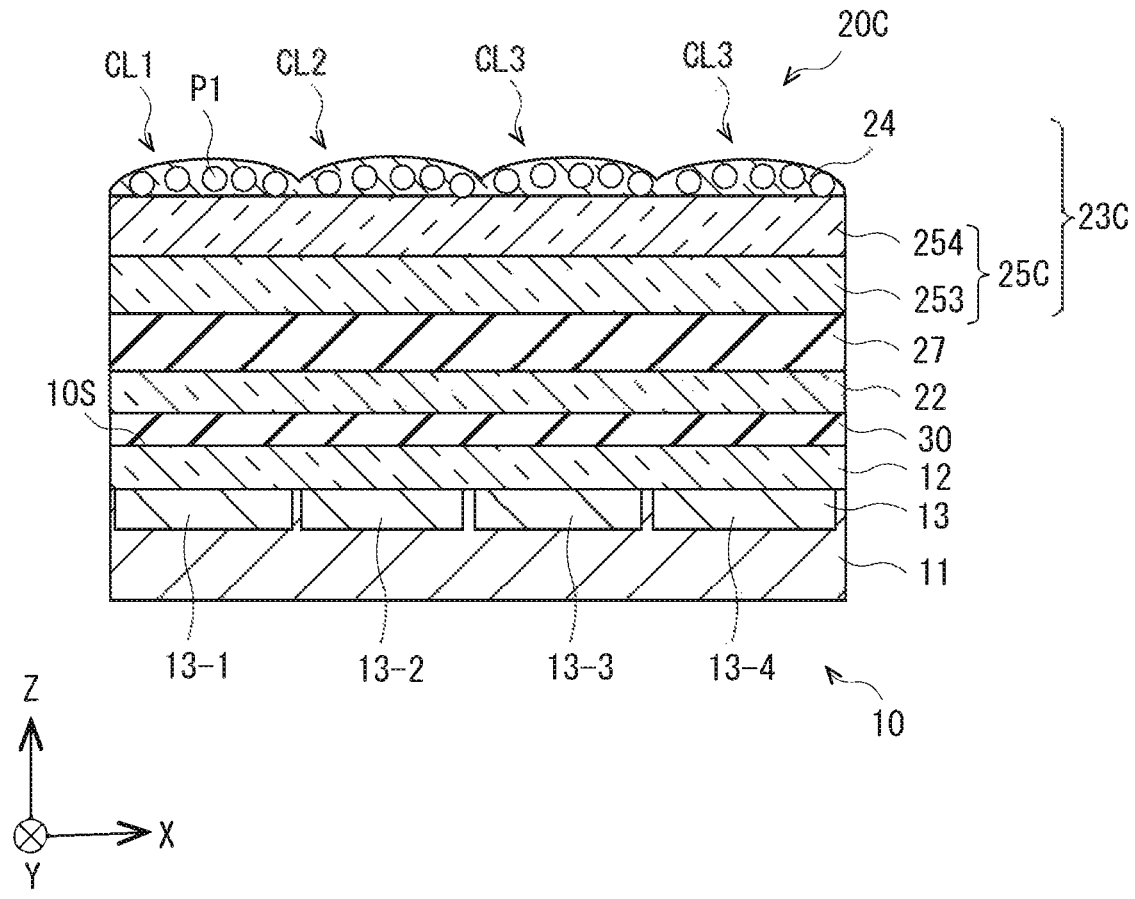

[ FIG. 6 ]
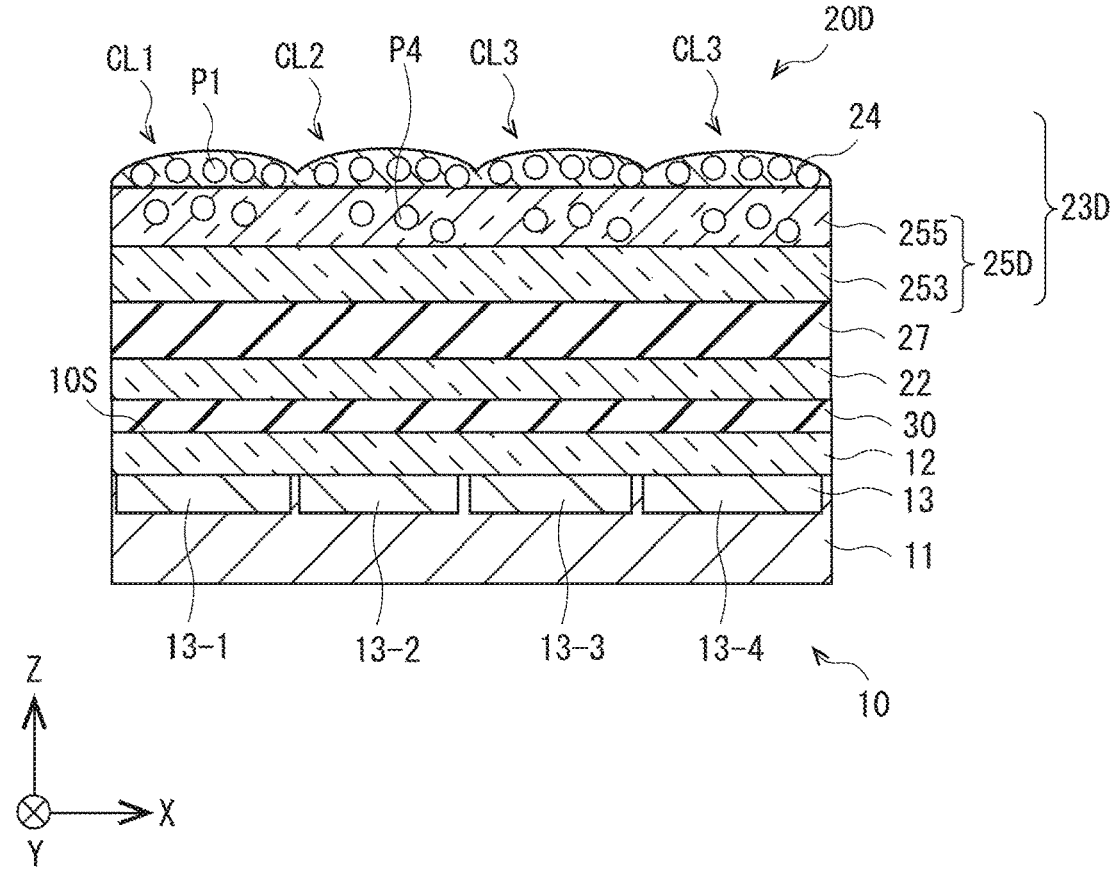

[ FIG. 7 ]
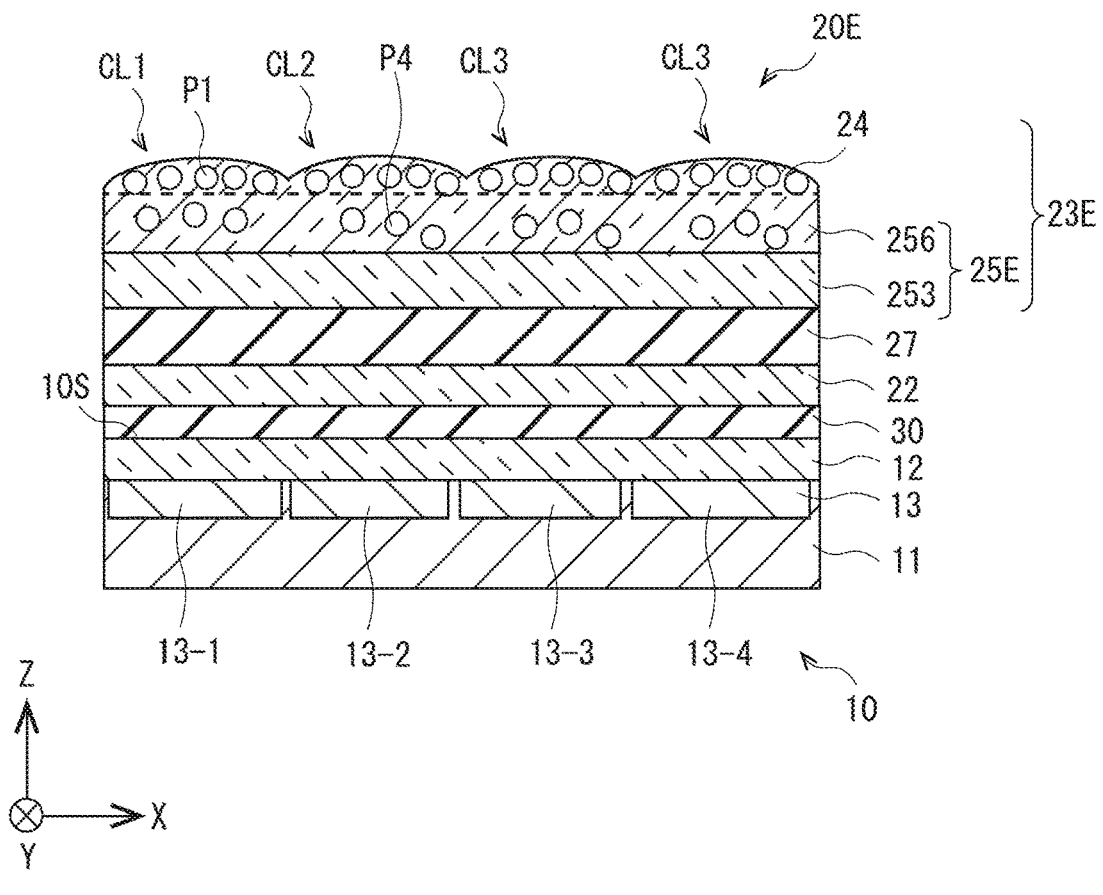

[ FIG. 8 ]
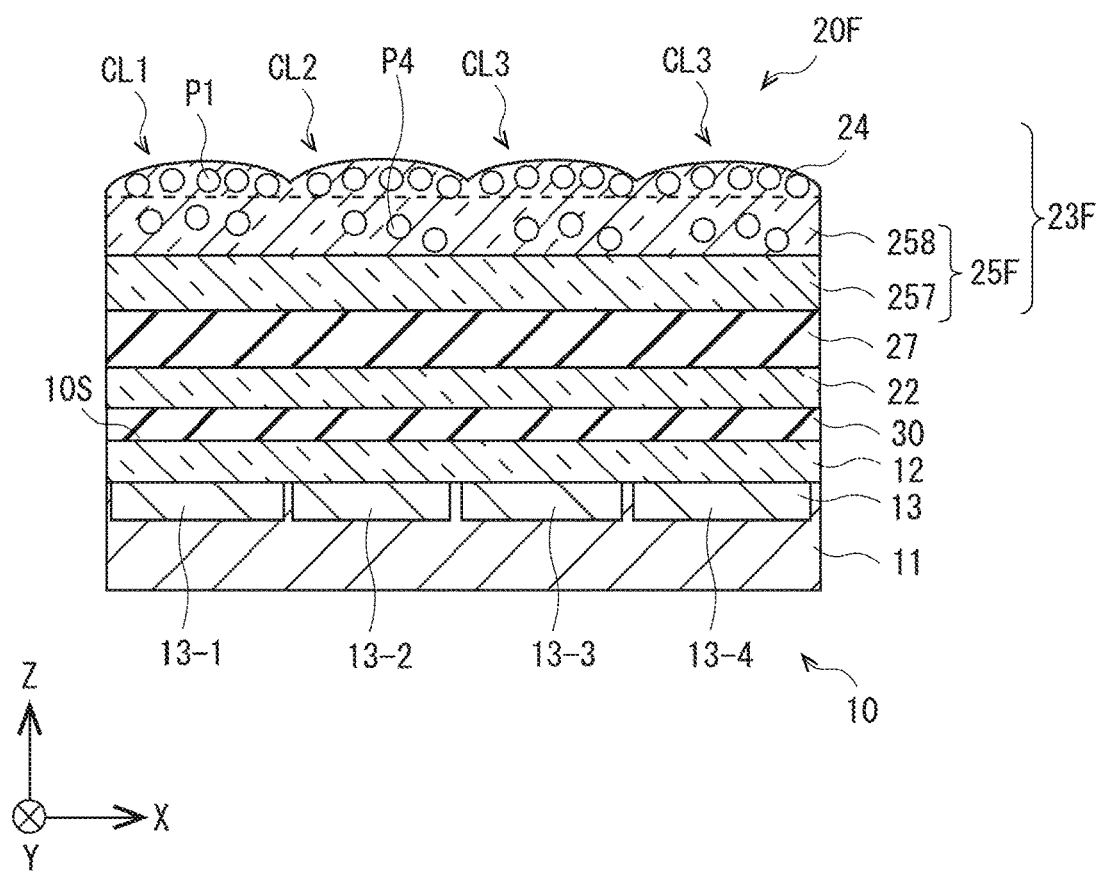

[ FIG. 9 ]
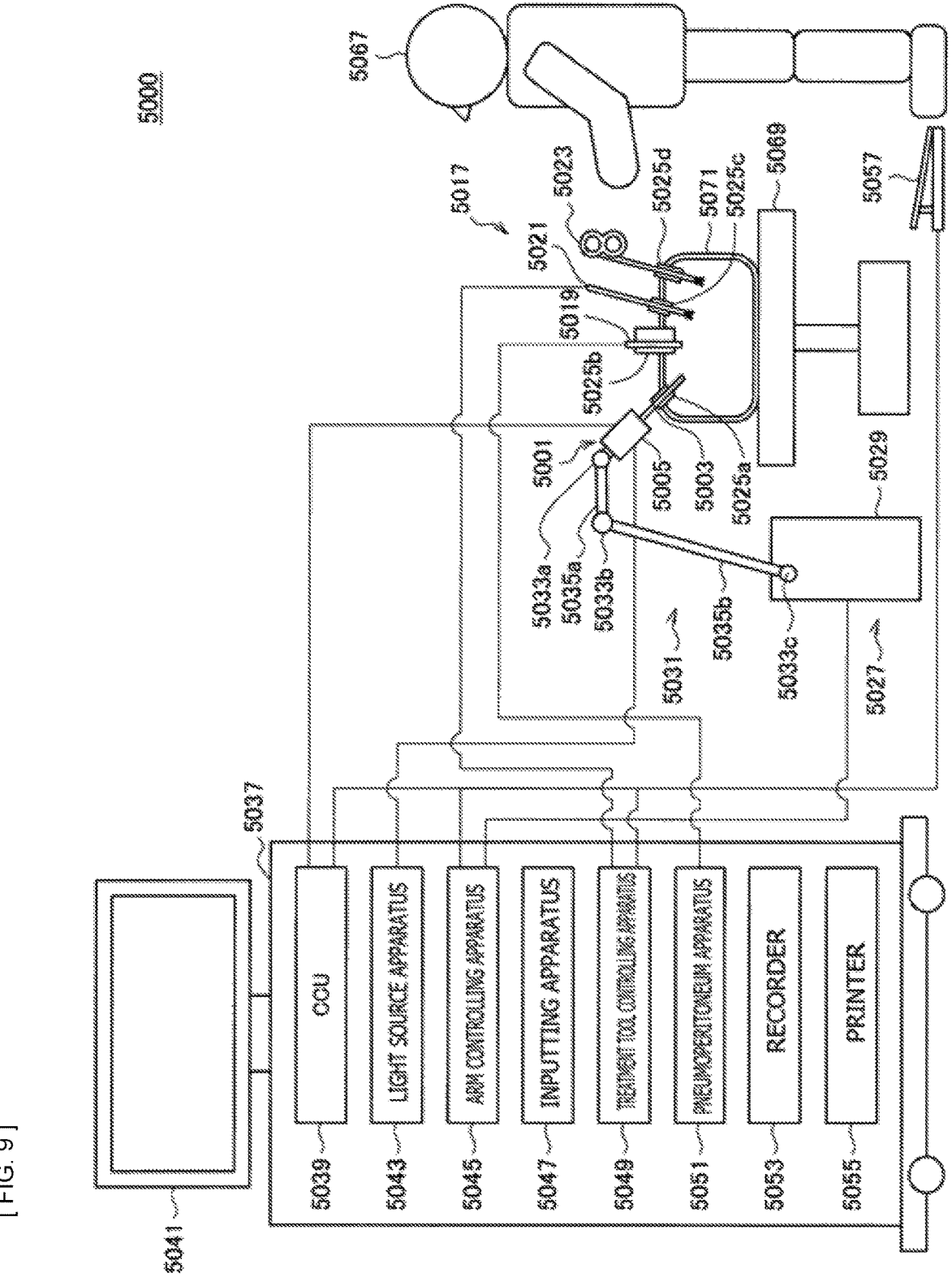
5000
5067
5017
5023
5021
5025d
5071
5025c
5069
5057
5019
5025b
5001
5033a
5035a
5033b
5005
5003
5025a
5035b
5033c
5029
5031
5027
5037
5041
| | |
|---|---|
| 5039 | CCU |
| 5043 | LIGHT SOURCE APPARATUS |
| 5045 | ARM CONTROLLING APPARATUS |
| 5047 | INPUTTING APPARATUS |
| 5049 | TREATMENT TOOL CONTROLLING APPARATUS |
| 5051 | PNEUMOPERITONEUM APPARATUS |
| 5053 | RECORDER |
| 5055 | PRINTER |

[ FIG. 10 ]
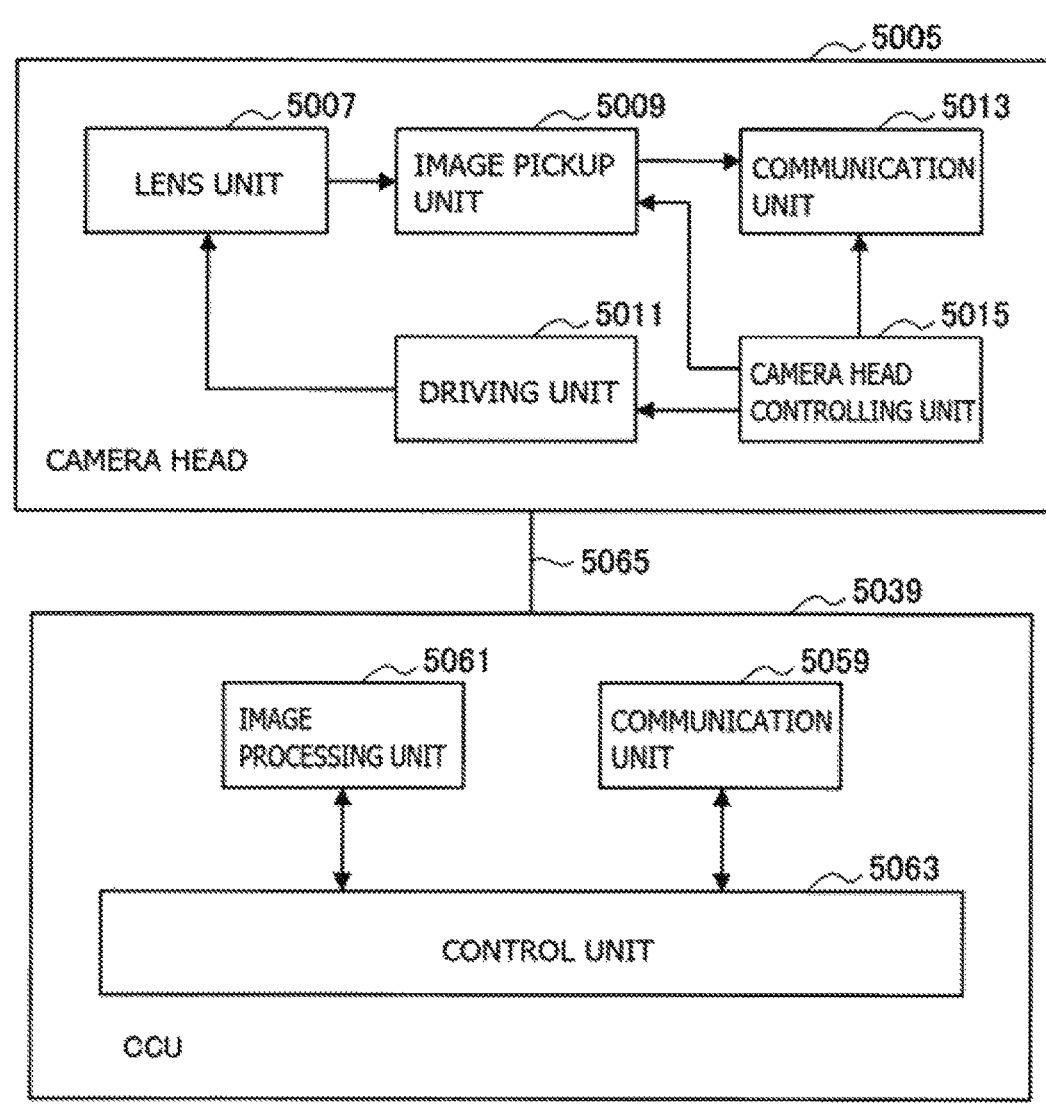

[ FIG. 11 ]
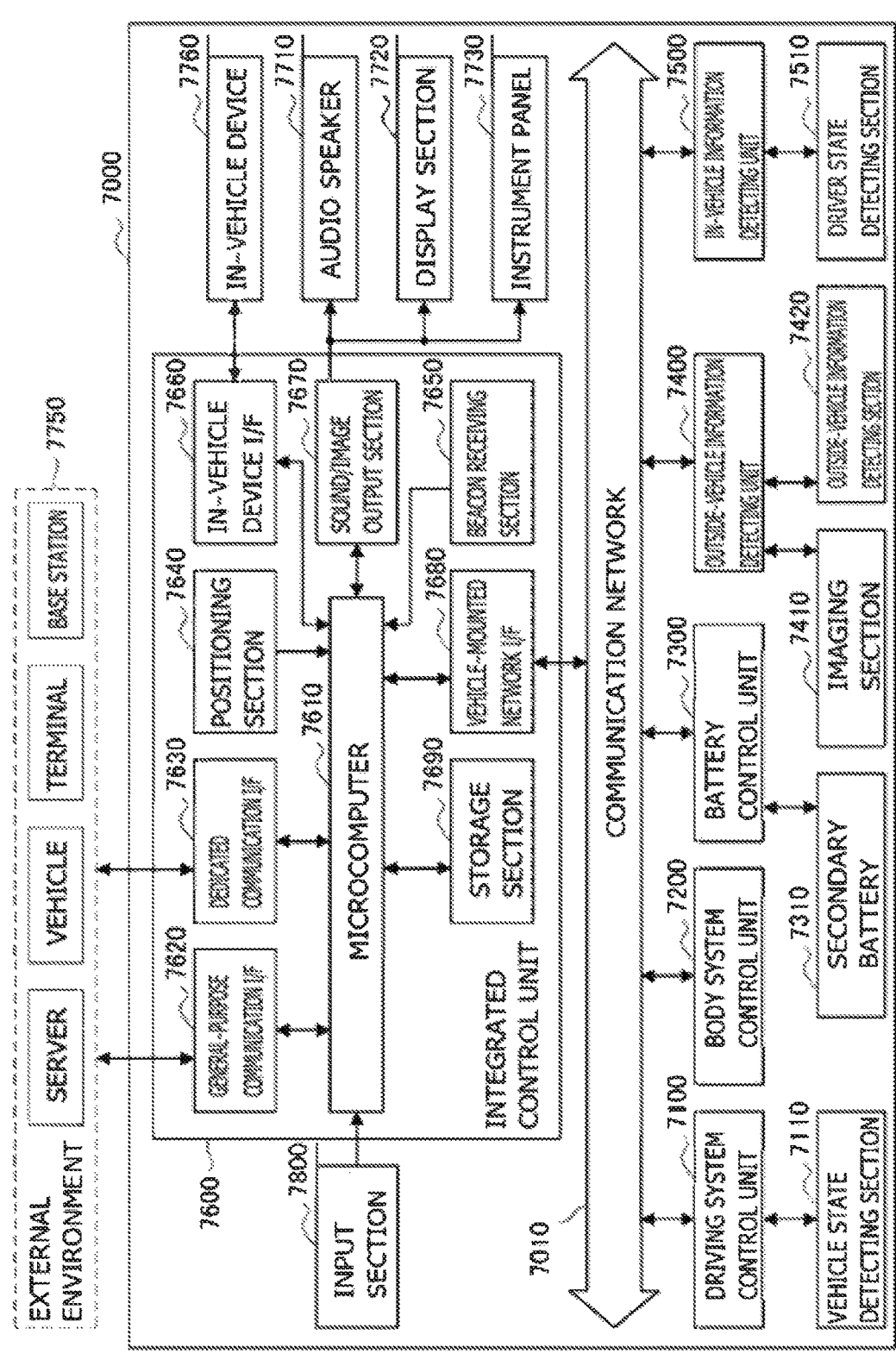

[ FIG. 12 ]
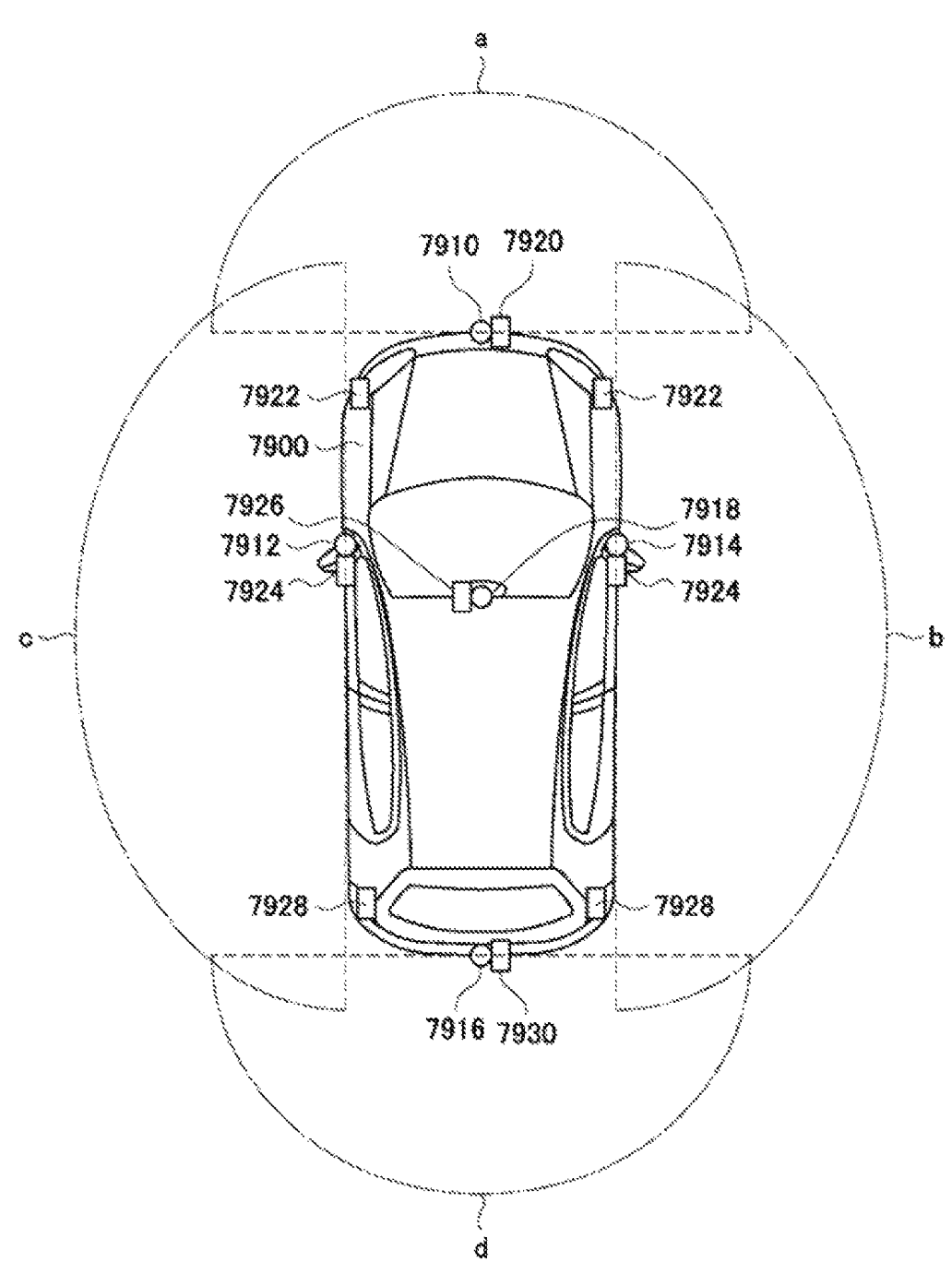

LENS ARRAY AND STEREOSCOPIC DISPLAY APPARATUS

CROSS REFERENCE TO RELATED APPLICATIONS

This application is a U.S. National Phase of International Patent Application No. PCT/JP2022/001045 filed on Jan. 14, 2022, which claims priority benefit of Japanese Patent Application No. JP 2021-012441 filed in the Japan Patent Office on Jan. 28, 2021. Each of the above-referenced applications is hereby incorporated herein by reference in its entirety.

TECHNICAL FIELD

The present disclosure relates to a lens array and a stereoscopic display apparatus including the lens array.

BACKGROUND ART

A light field display is under development as a stereoscopic display apparatus that displays an image appearing stereoscopically as if an object to be viewed actually exists. Typically, the light field display includes a display panel and a lens array. The display panel has a display surface. The lens array is disposed to be opposed to the display surface. The display panel includes, for example, a liquid crystal device, an organic EL device, or the like. A lens array applicable to a stereoscopic display apparatus is disclosed, for example, in PTL 1 and PTL 2.

CITATION LIST

Patent Literature

PTL 1: Japanese Unexamined Patent Application Publication No. 2014-178701
PTL 2: Japanese Unexamined Patent Application Publication No. 2008-89906

SUMMARY OF THE INVENTION

Incidentally, it is desired that a stereoscopic display apparatus have high display performance even in a case where a temperature environment changes.

It is desirable to provide a stereoscopic display apparatus having high display performance independently of a temperature environment, and a lens array unit mountable thereon.

A lens array unit according to an embodiment of the present disclosure includes a stacked structure. The stacked structure includes a resin lens array and a buffer layer. The resin lens array has a first coefficient of thermal expansion within a first range that includes a coefficient of thermal expansion of glass. The buffer layer has a second coefficient of thermal expansion higher than the first coefficient of thermal expansion.

BRIEF DESCRIPTION OF DRAWINGS

FIG. 1 is an exploded perspective view illustrating an overall configuration example of a stereoscopic display apparatus according to one embodiment of the present disclosure.

FIG. 2 is a cross-sectional view schematically illustrating, in an enlarged manner, a portion of the stereoscopic display apparatus illustrated in FIG. 1.

FIG. 3 is a cross-sectional view schematically illustrating, in an enlarged manner, a portion of a stereoscopic display apparatus as a first modification of the present disclosure.

FIG. 4 is a cross-sectional view schematically illustrating, in an enlarged manner, a portion of a stereoscopic display apparatus as a second modification of the present disclosure.

FIG. 5 is a cross-sectional view schematically illustrating, in an enlarged manner, a portion of a stereoscopic display apparatus as a third modification of the present disclosure.

FIG. 6 is a cross-sectional view schematically illustrating, in an enlarged manner, a portion of a stereoscopic display apparatus as a fourth modification of the present disclosure.

FIG. 7 is a cross-sectional view schematically illustrating, in an enlarged manner, a portion of a stereoscopic display apparatus as a fifth modification of the present disclosure.

FIG. 8 is a cross-sectional view schematically illustrating, in an enlarged manner, a portion of a stereoscopic display apparatus as a sixth modification of the present disclosure.

FIG. 9 is a view depicting an example of a schematic configuration of an endoscopic surgery system.

FIG. 10 is a block diagram depicting an example of a functional configuration of a camera head and a camera control unit (CCU) depicted in FIG. 9.

FIG. 11 is a block diagram depicting an example of schematic configuration of a vehicle control system.

FIG. 12 is a diagram of assistance in explaining an example of installation positions of an outside-vehicle information detecting section and an imaging section.

MODES FOR CARRYING OUT THE INVENTION

In the following, some embodiments of the present disclosure are described in detail with reference to the drawings. Note that the description is given in the following order.

1. Embodiment
An example of a stereoscopic display apparatus in which a lenticular lens is attached to a display panel.
2. Modifications
3. Example of Practical Application to Endoscopic Surgery System
4. Example of Application to Mobile Body Control System
5. Other Modifications

1. Embodiment

[Configuration of Stereoscopic Display Apparatus 1]

Overall Configuration Example

FIG. 1 illustrates an overall configuration example of a stereoscopic display apparatus 1 according to an embodiment of the present disclosure. The stereoscopic display apparatus 1 includes a display panel 10 and a lens array unit 20. The display panel 10 and the lens array unit 20 each expand along an XY plane including an X-axis and a Y-axis orthogonal to each other. The display panel 10 and the lens array unit 20 are so disposed as to overlap each other in the Z-axis. The Z-axis is orthogonal to both the X-axis and the Y-axis. The display panel 10 includes a display surface 10S on which an image is to be displayed. The lens array unit 20 is so disposed in front of the display panel 10, that is, on a viewer side of the display panel 10, to be opposed to the display surface 10S of the display panel 10.

FIG. 2 is a schematic cross-sectional view illustrating a cross-sectional configuration example of the stereoscopic display apparatus 1. As illustrated in FIG. 2, the display panel 10 and the lens array unit 20 are adhered to each other with an adhesive layer 30 interposed therebetween. The adhesive layer 30 includes, for example, a resin adhesive material such as an acrylic-based adhesive.

(Display Panel 10)

The display panel 10 is a display device that displays an image on the display surface 10S on the basis of an image signal. The display panel 10 includes, for example, a circuit board 11 and a glass substrate 12. The circuit board 11 and the glass substrate 12 are stacked in a Z-axis direction.

For example, multiple display pixels 13 are arranged on the circuit board 11. In addition, a drive circuit or the like is provided on the circuit board 11. The drive circuit is adapted to drive the multiple display pixels 13.

The glass substrate 12 is so provided as to cover the multiple display pixels 13. The glass substrate 12 is, for example, a plate-shaped member including a glass material that has a coefficient of thermal expansion of higher than or equal to 6 ppm/° C. and lower than or equal to 20 ppm/° C. Examples of the glass material include alkali-free glass for a color filter. The glass substrate 12 protects the multiple display pixels 13.

The multiple display pixels 13 each include, for example, a liquid crystal device or an organic EL device.

(Lens Array Unit 20)

The lens array unit 20 is so disposed as to be opposed to the display surface 10S of the display panel 10. The lens array unit 20 includes a stacked structure in which a polarizer 22, an adhesive layer 21, and a lens array sheet 23 are stacked in this order. The lens array sheet 23 includes a resin lens array 24 and a buffer layer 25. The buffer layer 25 is positioned between the resin lens array 24 and the polarizer 22. The polarizer 22 is firmly adhered to the glass substrate 12 by the adhesive layer 30 provided on the glass substrate 12. The buffer layer 25 of the lens array sheet 23 is firmly adhered to the polarizer 22 by the adhesive layer 21 provided on the polarizer 22.

The polarizer 22 is, for example, a polarizing film including a resin. The polarizer 22 is positioned on an opposite side to the resin lens array 24 as viewed from the buffer layer 25.

The resin lens array 24 is a lenticular lens in which multiple cylindrical lenses CL (CL1 to CL4) are arranged. The multiple cylindrical lenses CL include a resin. The resin lens array 24 includes, for example, a urethane-acrylic-based photocurable resin as a main constituent material. Multiple first particles P1 are dispersed in the resin lens array 24. The first particles $P_1$ include, for example, an inorganic material such as titanium oxide ($TiO_2$), zirconium oxide ($ZrO_2$), or silicon oxide ($SiO_2$). The resin lens array 24 has a first coefficient of thermal expansion that is included in a first range of higher than or equal to 6 ppm/° C. and lower than or equal to 20 ppm/° C. The first range includes a coefficient of thermal expansion of glass. A first coefficient of thermal expansion of the resin lens array 24 in an X-axis direction is, for example, 10 ppm/° C. A first coefficient of thermal expansion of the resin lens array 24 in a Y-axis direction is, for example, also 10 ppm/° C.

The buffer layer 25 is a resin layer of a single-layered structure, including, for example, an epoxy-acrylic-based photocurable resin as a main constituent material. The buffer layer 25 has a second coefficient of thermal expansion higher than the first coefficient of thermal expansion. The second coefficient of thermal expansion is, for example, higher than or equal to 40 ppm/° C. and lower than or equal to 75 ppm/° C. Specifically, a second coefficient of thermal expansion of the buffer layer 25 in the X-axis direction is, for example, 60 ppm/° C. A second coefficient of thermal expansion of the buffer layer 25 in the Y-axis direction is, for example, also 60 ppm/° C.

The buffer layer 25 includes multiple second particles P2. The second particles P2 include, for example, an inorganic material such as titanium oxide ($TiO_2$), zirconium oxide ($ZrO_2$), or silicon oxide ($SiO_2$).

A ratio of a volume of all of the first particles P1 present in the resin lens array 24 to a volume of the resin lens array 24 is higher than a ratio of a volume of all of the second particles P2 present in the buffer layer 25 to a volume of the buffer layer 25. Specifically, the ratio of the volume of all of the first particles P1 to the volume of the resin lens array 24 is, for example, higher than or equal to 40 vol % and lower than or equal to 90 vol %, and is, for example, 50 vol %. The ratio of the volume of all of the second particles P2 to the volume of the buffer layer 25 is, for example, higher than or equal to 1 vol % and lower than or equal to 40 vol %, and is, for example, 2 vol %.

The adhesive layer 21 includes, for example, a resin adhesive material such as an acrylic-based adhesive.

[Workings and Effects of Stereoscopic Display Apparatus 1]

The stereoscopic display apparatus 1 of the present embodiment includes the lens array unit 20 including the stacked structure that includes the resin lens array 24 and the buffer layer 25. This makes it possible to reduce weight, as compared with a case of including a lens array including glass.

In addition, the resin lens array 24 has the first coefficient of thermal expansion within the first range including the coefficient of thermal expansion of glass. This makes it possible, for example, in a case where it is adhered to the glass substrate 12 of the display panel 10, to maintain high accuracy regarding relative positions in the XY plane between the display pixels 13-1 to 13-4 of the display panel 10 and the cylindrical lenses CL1 to CL4 that are to correspond to the display pixels 13-1 to 13-4. Therefore, according to the stereoscopic display apparatus 1 including the lens array unit 20, it is possible to exhibit high display performance even in a case where a temperature environment changes. That is, the stereoscopic display apparatus 1 is able to display, for example, a right-eye image to be viewed by a right eye of a viewer and a left-eye image to be viewed by a left eye of the viewer in such a manner that the viewer is able to visually recognize them from an appropriate angle. Note that in FIG. 2, the display pixels 13-1 to 13-4 and the cylindrical lenses CL1 to CL4 are illustrated in such a manner that the display pixels 13-1 to 13-4 correspond to the cylindrical lenses CL1 to CL4, respectively. However, the present embodiment is not limited to a positional relationship illustrated in FIG. 2. That is, the present embodiment is not limited to a case where one display pixel 13 and one cylindrical lens CL correspond to each other. In the present embodiment, one cylindrical lens CL may correspond to two or more display pixels 13.

In addition, in the lens array unit 20, the buffer layer 25 has the second coefficient of thermal expansion higher than the first coefficient of thermal expansion. Accordingly, it is possible to prevent occurrence of warpage of the lens array unit 20, occurrence of falling off of the lens array sheet 23 from the glass substrate 12, or the like, that accompanies a change in the temperature environment. A reason for this is that the buffer layer 25 serves to relieve stress caused by a difference in a rate between expansion of the polarizer 22 and expansion of the resin lens array 24 accompanying a change in the temperature environment. Accordingly, for example, in the stereoscopic display apparatus 1 in which the lens array unit 20 is disposed on the display surface 10S of the display panel 10, it is possible to avoid occurrence of warpage as a whole, the occurrence of the falling off of the lens array sheet 23, or the like even in a case where the temperature environment changes.

2. Modifications

First Modification

FIG. 3 is a schematic cross-sectional view illustrating an overall configuration example of a stereoscopic display apparatus 1A as a first modification of the present disclosure. The stereoscopic display apparatus 1A includes the display panel 10 and a lens array unit 20A. The lens array unit 20A includes a lens array sheet 23A instead of the lens array sheet 23. Except for this point, a configuration of the stereoscopic display apparatus 1A is substantially the same as the configuration of the stereoscopic display apparatus 1. Therefore, a description is given below of a configuration of the lens array sheet 23A of the stereoscopic display apparatus 1A. Descriptions regarding components of the stereoscopic display apparatus 1A other than the lens array sheet 23A are omitted as appropriate.

In the stereoscopic display apparatus 1 of the embodiment described above, the main constituent material included in the resin lens array 24 and the main constituent material included in the buffer layer 25 are set to be different from each other. In contrast, in the stereoscopic display apparatus 1A as the first modification, the main constituent material included in the resin lens array 24 and the main constituent material included in the buffer layer 25 are substantially the same. Specifically, the respective main constituent materials included in the resin lens array 24 and the buffer layer 25 are both, for example, a urethane-acrylic-based photocurable resin.

The resin lens array 24 of the first modification includes the multiple first particles P1. Similarly, the buffer layer 25 of the first modification includes the multiple second particles P2. The ratio of the volume of all of the first particles P1 present in the resin lens array 24 to the volume of the resin lens array 24 is higher than the ratio of the volume of all of the second particles P2 present in the buffer layer 25 to the volume of the buffer layer 25. The ratio of the volume of all of the first particles P1 to the volume of the resin lens array 24 is, for example, higher than or equal to 40 vol % and lower than or equal to 90 vol %, and is, for example, 50 vol %. The ratio of the volume of all of the second particles P2 to the volume of the buffer layer 25 is, for example, higher than or equal to 1 vol % and lower than or equal to 40 vol %, and is, for example, 10 vol %.

A first coefficient of thermal expansion of the resin lens array 24 in the X-axis direction is, for example, 10 ppm/° C. A first coefficient of thermal expansion of the resin lens array 24 in the Y-axis direction is, for example, also 10 ppm/° C. In addition, a second coefficient of thermal expansion of the buffer layer 25 in the X-axis direction is, for example, 40 ppm/° C. A second coefficient of thermal expansion of the buffer layer 25 in the Y-axis direction is, for example, also 40 ppm/° C.

As described above, the stereoscopic display apparatus 1A as the first modification includes the lens array unit 20A including the lens array sheet 23A that includes the resin lens array 24 and the buffer layer 25. Here, the main constituent material included in the resin lens array 24 and the main constituent material included in the buffer layer 25 are substantially the same. Therefore, it is possible to integrally mold the resin lens array 24 and the buffer layer 25. Accordingly, a manufacturing process is simplified, which is advantageous in reducing a manufacturing cost.

Second Modification

FIG. 4 is a schematic cross-sectional view illustrating an overall configuration example of a stereoscopic display apparatus 1B as a second modification of the present disclosure. The stereoscopic display apparatus 1B includes the display panel 10 and a lens array unit 20B. The lens array unit 20B includes a lens array sheet 23B instead of the lens array sheet 23. The lens array sheet 23B includes a buffer layer 25B instead of the buffer layer 25. Except for this point, a configuration of the stereoscopic display apparatus 1B is substantially the same as the configuration of the stereoscopic display apparatus 1. Therefore, a description is given below of a configuration of the lens array sheet 23B of the stereoscopic display apparatus 1B. Descriptions regarding components of the stereoscopic display apparatus 1B other than the lens array sheet 23B are omitted as appropriate.

In the stereoscopic display apparatus 1 of the embodiment described above, the buffer layer 25 having a single-layered structure is included. In contrast, in the stereoscopic display apparatus 1B as the second modification, the buffer layer 25B of a multi-layered structure is included. The buffer layer 25B includes a stacked structure including a first layer 251 and a second layer 252.

The first layer 251 is opposed to the polarizer 22 with the adhesive layer 21 interposed therebetween. The first layer 251 is, for example, a resin layer including an epoxy-acrylic-based photocurable resin as a main constituent material. The first layer 251 includes multiple third particles P3. The third particles P3 include, for example, an inorganic material such as titanium oxide ($TiO_2$), zirconium oxide ($ZrO_2$), or silicon oxide ($SiO_2$).

The second layer 252 is positioned between the first layer 251 and the resin lens array 24. The second layer 252 is in contact with the resin lens array 24B. The second layer 252 is, for example, a resin layer including a urethane-acrylic-based photocurable resin as a main constituent material. The second layer 252 includes the multiple second particles P2.

The ratio of the volume of all of the first particles P1 present in the resin lens array 24 to the volume of the resin lens array 24 is higher than a ratio of a volume of all of the second particles P2 present in the second layer 252 to a volume of the second layer 252 of the buffer layer 25. Specifically, the ratio of the volume of all of the first particles P1 to the volume of the resin lens array 24 is, for example, higher than or equal to 40 vol % and lower than or equal to 90 vol %, and is, for example, 50 vol %. The ratio of the volume of all of the second particles P2 to the volume of the second layer 252 is, for example, higher than or equal to 1 vol % and lower than or equal to 40 vol %, and is, for example, 10 vol %.

The ratio of the volume of all of the second particles P2 present in the second layer 252 to the volume of the second layer 252 of the buffer layer 25 is higher than a ratio of a volume of all of the third particles P3 present in the first layer 251 to a volume of the first layer 251 of the buffer layer 25. Specifically, the ratio of the volume of all of the second particles P2 to the volume of the second layer 252 is, for example, higher than or equal to 1 vol % and lower than or equal to 10 vol %, and is, for example, 10 vol %. The ratio of the volume of all of the first particles P1 to the volume of the first layer 251 is, for example, higher than or equal to 1 vol % and lower than or equal to 10 vol %, and is, for example, 5 vol %.

A coefficient of thermal expansion of the resin lens array 24 in the X-axis direction is, for example, 10 ppm/° C. A coefficient of thermal expansion of the resin lens array 24 in the Y-axis direction is, for example, also 10 ppm/° C. A coefficient of thermal expansion of the second layer 252 in the X-axis direction is, for example, 40 ppm/° C. A coefficient of thermal expansion of the second layer 252 in the Y-axis direction is, for example, also 40 ppm/° C. A coefficient of thermal expansion of the first layer 251 in the X-axis direction is, for example, 50 ppm/° C. A coefficient of thermal expansion of the first layer 251 in the Y-axis direction is, for example, also 50 ppm/° C.

As described above, the stereoscopic display apparatus 1B as the second modification includes the lens array unit 20B including the lens array sheet 23B that includes the resin lens array 24 and the buffer layer 25B. Here, the buffer layer 25B includes the stacked structure including two layers different in coefficient of thermal expansion, i.e., the first layer 251 and the second layer 252. Here, the coefficient of thermal expansion of the first layer 251 is higher than the coefficient of thermal expansion of the second layer 252. The coefficient of thermal expansion of the second layer 252 is higher than the coefficient of thermal expansion of the resin lens array 24. Accordingly, it is possible to more effectively prevent occurrence of warpage of the lens array unit 20B, occurrence of falling off of the lens array sheet 23B from the glass substrate 12, or the like, that accompanies a change in the temperature environment. A reason for this is that the buffer layer 25B serves to further relieve the stress caused by the difference in the rate between the expansion of the polarizer 22 and the expansion of the resin lens array 24 accompanying a change in the temperature environment.

Note that FIG. 4 illustrates, as an example, a case where the buffer layer 25B includes two layers, i.e., the first layer 251 and the second layer 252. However, the present modification is not limited thereto. The buffer layer 25B may include, for example, three or more layers. In such a case, the multiple layers included in the buffer layer 25B may preferably be disposed in such a manner that the coefficient of thermal expansion gradually becomes smaller from the polarizer 22 toward the resin lens array 24. That is, where the buffer layer 25 includes n-number of layers, and the respective layers from a first layer L1 to an n-th layer Ln have coefficients of thermal expansion of $\alpha 1, \alpha 2, \ldots, \alpha(n-1)$, and an, the layers may preferably be stacked from the polarizer 22 toward the resin lens array 24 in order of the layer L1, a layer L2, . . . , a layer L(n−1), and the layer Ln. Note that, here, it is assumed that a relationship represented by $22\alpha > \alpha 1 > \alpha 2 > \ldots > \alpha(n-1) > \alpha n > 24\alpha$ is satisfied. $22\alpha$ is a coefficient of thermal expansion of the polarizer 22, and $24\alpha$ is the coefficient of thermal expansion of the resin lens array 24. By causing the buffer layer 25B to include the multi-layered structure including three or more layers different in coefficient of thermal expansion from each other in such a manner, it is possible to further alleviate distortion inside the buffer layer 25B accompanying a change in the temperature environment.

Third Modification

FIG. 5 is a schematic cross-sectional view illustrating an overall configuration example of a stereoscopic display apparatus 1C as a third modification of the present disclosure. The stereoscopic display apparatus 1C includes the display panel 10 and a lens array unit 20C. The lens array unit 20C includes a lens array sheet 23C instead of the lens array sheet 23. The lens array sheet 23C includes a buffer layer 25C instead of the buffer layer 25. Except for this point, a configuration of the stereoscopic display apparatus 1C is substantially the same as the configuration of the stereoscopic display apparatus 1. Therefore, a description is given below of a configuration of the lens array sheet 23C of the stereoscopic display apparatus 1C. Descriptions regarding components of the stereoscopic display apparatus 1C other than the lens array sheet 23C are omitted as appropriate.

The buffer layer 25C includes a resin film 253 and a resin coating film 254. The resin film 253 and the resin coating film 254 expand in each of the X-axis direction and the Y-axis direction. The resin film 253 is a sheet-shaped base. The sheet-shaped base includes, for example, a resin such as a cycloolefin polymer (COP). The resin coating film 254 is positioned between the resin film 253 and the resin lens array 24. The resin coating film 254 is so provided as to cover the resin film 253. A surface, of the resin coating film 254, on an opposite side to the resin film 253 is in contact with the resin lens array 24. A constituent material included in the resin coating film 254 is, for example, a polyamide resin.

The coefficient of thermal expansion of the resin lens array 24 in the X-axis direction is, for example, 10 ppm/° C. The coefficient of thermal expansion of the resin lens array 24 in the Y-axis direction is, for example, also 10 ppm/° C. A coefficient of thermal expansion of the resin coating film 254 in the X-axis direction is, for example, 55 ppm/° C. A coefficient of thermal expansion of the resin coating film 254 in the Y-axis direction is, for example, also 55 ppm/° C. A coefficient of thermal expansion of the resin film 253 in the X-axis direction is, for example, 70 ppm/° C. A coefficient of thermal expansion of the resin film 253 in the Y-axis direction is, for example, also 70 ppm/° C. A Young's modulus of the resin film 253 in the X-axis direction and a Young's modulus of the resin film 253 in the Y-axis direction are each, for example, 3 GPa.

In the stereoscopic display apparatus 1C as the third modification, the buffer layer 25C in which the resin coating film 254 is applied on the resin film 253 is used. Therefore, it is possible to perform fabrication of the lens array sheet 23C separately from and independently of fabrication of the display panel 10. Accordingly, handling of the lens array sheet 23C becomes easy, which is preferable in terms of production control.

In addition, the buffer layer 25C includes a stacked structure including two members different in coefficient of thermal expansion, i.e., the resin film 253 and the resin coating film 254. Here, the coefficient of thermal expansion of the resin film 253 is higher than the coefficient of thermal expansion of the resin coating film 254. The coefficient of thermal expansion of the resin coating film 254 is higher than the coefficient of thermal expansion of the resin lens array 24. Accordingly, it is possible to more effectively prevent occurrence of warpage of the lens array unit 20C, occurrence of falling off of the lens array sheet 23C from the glass substrate 12, or the like, that accompanies a change in the temperature environment. A reason for this is that the buffer layer 25C serves to further relieve the stress caused by the difference in the rate between the expansion of the polarizer 22 and the expansion of the resin lens array 24 accompanying a change in the temperature environment.

Because the buffer layer 25C employs the resin film 253 which is the sheet-shaped base, it is possible to consider that variation in expansion rate in the XY plane is less as compared with a case where a resin coating film or the like is used instead of the resin film 253. Accordingly, it is possible to consider that distortion inside the buffer layer 25C is alleviated more uniformly in the XY plane.

Fourth Modification

FIG. 6 is a schematic cross-sectional view illustrating an overall configuration example of a stereoscopic display apparatus 1D as a fourth modification of the present disclosure. The stereoscopic display apparatus 1D includes the display panel 10 and a lens array unit 20D. The lens array unit 20D includes a lens array sheet 23D instead of the lens array sheet 23. The lens array sheet 23D includes a buffer layer 25D instead of the buffer layer 25C. Except for this point, a configuration of the stereoscopic display apparatus 1D is substantially the same as the configuration of the stereoscopic display apparatus 1C as the third modification. Therefore, a description is given below of a configuration of the lens array sheet 23D of the stereoscopic display apparatus 1D. Descriptions regarding components of the stereoscopic display apparatus 1D other than the lens array sheet 23D are omitted as appropriate.

The buffer layer 25D includes the resin film 253 and a resin coating film 255. The resin film 253 and the resin coating film 255 expand in each of the X-axis direction and the Y-axis direction. The resin coating film 255 is positioned between the resin film 253 and the resin lens array 24. The resin coating film 255 is so provided as to cover the resin film 253. A surface, of the resin coating film 255, on an opposite side to the resin film 253 is in contact with the resin lens array 24. A constituent material included in the resin coating film 255 is, for example, an epoxy-acrylic-based photocurable resin.

The resin coating film 255 includes multiple fourth particles P4. The fourth particles P4 include, for example, an inorganic material such as titanium oxide ($TiO_2$), zirconium oxide ($ZrO_2$), or silicon oxide ($SiO_2$). A ratio of a volume of all of the fourth particles P4 present in the resin coating film 255 to a volume of the resin coating film 255 is lower than a ratio of a volume of all of the first particles P1 present in the resin lens array 24. Specifically, the ratio of the volume of all of the first particles P1 to the volume of the resin lens array 24 is, for example, higher than or equal to 40 vol % and lower than or equal to 90 vol %, and is, for example, 50 vol %. The ratio of the volume of all of the fourth particles P4 to the volume of the resin coating film 255 is, for example, higher than or equal to 1 vol % and lower than or equal to 10 vol %, and is, for example, 5 vol %.

The coefficient of thermal expansion of the resin lens array 24 in the X-axis direction is, for example, 10 ppm/° C. The coefficient of thermal expansion of the resin lens array 24 in the Y-axis direction is, for example, also 10 ppm/° C. A coefficient of thermal expansion of the resin coating film 255 in the X-axis direction is, for example, 50 ppm/° C. A coefficient of thermal expansion of the resin coating film 255 in the Y-axis direction is, for example, also 50 ppm/° C. The coefficient of thermal expansion of the resin film 253 in the X-axis direction is, for example, 70 ppm/° C. The coefficient of thermal expansion of the resin film 253 in the Y-axis direction is, for example, also 70 ppm/° C. The Young's modulus of the resin film 253 in the X-axis direction and the Young's modulus of the resin film 253 in the Y-axis direction are each, for example, 3 GPa.

In the stereoscopic display apparatus 1D as the fourth modification, the resin coating film 255 of the buffer layer 25D includes the multiple fourth particles P4. Therefore, it is possible to still further relieve the stress caused by the difference in the rate between the expansion of the polarizer 22 and the expansion of the resin lens array 24 accompanying a change in the temperature environment, as compared with the stereoscopic display apparatus 1C as the third modification. Accordingly, it is possible to more effectively prevent occurrence of warpage of the lens array unit 20D, occurrence of falling off of the lens array sheet 23D from the glass substrate 12, or the like, the accompanies a change in the temperature environment. In addition, because the resin coating film 255 of the buffer layer 25D includes the multiple fourth particles P4, there are more options for the resin material usable as the constituent material, as compared with the resin coating film 254 including no particles. Accordingly, the freedom in design improves.

Fifth Modification

FIG. 7 is a schematic cross-sectional view illustrating an overall configuration example of a stereoscopic display apparatus 1E as a fifth modification of the present disclosure. The stereoscopic display apparatus 1E includes the display panel 10 and a lens array unit 20E. The lens array unit 20E includes a lens array sheet 23E instead of the lens array sheet 23. The lens array sheet 23E includes a buffer layer 25E instead of the buffer layer 25D. Except for this point, a configuration of the stereoscopic display apparatus 1E is substantially the same as the configuration of the stereoscopic display apparatus 1D as the fourth modification. Therefore, a description is given below of a configuration of the lens array sheet 23E of the stereoscopic display apparatus 1E. Descriptions regarding components of the stereoscopic display apparatus 1E other than the lens array sheet 23E are omitted as appropriate.

The buffer layer 25E includes the resin film 253 and a resin coating film 256. The resin film 253 and the resin coating film 256 expand in each of the X-axis direction and the Y-axis direction. The resin coating film 256 is positioned between the resin film 253 and the resin lens array 24. The resin coating film 256 is so provided as to cover the resin film 253. A surface, of the resin coating film 256, on an opposite side to the resin film 253 is in contact with the resin lens array 24.

In the stereoscopic display apparatus 1E as the fifth modification, the main constituent material included in the resin lens array 24 and a main constituent material included in the resin coating film 256 are substantially the same. Specifically, the respective main constituent materials included in the resin lens array 24 and the resin coating film 256 are both, for example, a urethane-acrylic-based photocurable resin.

The resin coating film 256 includes the multiple fourth particles P4. A ratio of a volume of all of the fourth particles P4 present in the resin coating film 256 to a volume of the resin coating film 256 is lower than the ratio of the volume of all of the first particles P1 present in the resin lens array 24. Specifically, the ratio of the volume of all of the first particles P1 to the volume of the resin lens array 24 is, for example, higher than or equal to 40 vol % and lower than or equal to 90 vol %, and is, for example, 50 vol %. The ratio of the volume of all of the fourth particles P4 to the volume of the resin coating film 256 is, for example, higher than or equal to 1 vol % and lower than or equal to 40 vol %, and is, for example, 10 vol %.

The coefficient of thermal expansion of the resin lens array 24 in the X-axis direction is, for example, 10 ppm/° C. The coefficient of thermal expansion of the resin lens array 24 in the Y-axis direction is, for example, also 10 ppm/° C. A coefficient of thermal expansion of the resin coating film 256 in the X-axis direction is, for example, 40 ppm/° C. A coefficient of thermal expansion of the resin coating film 256 in the Y-axis direction is, for example, also 40 ppm/° C. The coefficient of thermal expansion of the resin film 253 in the X-axis direction is, for example, 70 ppm/° C. The coefficient of thermal expansion of the resin film 253 in the Y-axis direction is, for example, also 70 ppm/° C. The Young's modulus of the resin film 253 in the X-axis direction and the Young's modulus of the resin film 253 in the Y-axis direction are each, for example, 3 GPa.

In the stereoscopic display apparatus 1E as the fifth modification, the main constituent material included in the resin coating film 256 of the buffer layer 25E is the same as the main constituent material included in the resin lens array 24. Therefore, it is possible to integrally mold the resin lens array 24 and the resin coating film 256. Accordingly, a manufacturing process is simplified, which is advantageous in reducing a manufacturing cost.

Sixth Modification

FIG. 8 is a schematic cross-sectional view illustrating an overall configuration example of a stereoscopic display apparatus 1F as a sixth modification of the present disclosure. The stereoscopic display apparatus 1F includes the display panel 10 and a lens array unit 20F. The lens array unit 20F includes a lens array sheet 23F instead of the lens array sheet 23. The lens array sheet 23F includes a buffer layer 25F instead of the buffer layer 25E. Except for this point, a configuration of the stereoscopic display apparatus 1F is substantially the same as the configuration of the stereoscopic display apparatus 1E as the fifth modification. Therefore, a description is given below of a configuration of the lens array sheet 23F of the stereoscopic display apparatus 1F. Descriptions regarding components of the stereoscopic display apparatus 1F other than the lens array sheet 23F are omitted as appropriate.

The buffer layer 25F includes a resin film 257 and a resin coating film 258. The resin film 257 and the resin coating film 258 expand in each of the X-axis direction and the Y-axis direction.

The resin film 257 is a sheet-shaped base. The sheet-shaped base includes, for example, a crystalline polymer material such as polyethylene naphthalate (PEN). The crystalline polymer material refers to a material in which some molecules are oriented and crystallized in a stretching process in manufacturing the resin film 257. Generally, a magnification for stretching the crystalline polymer material in a certain direction in the stretching process and a Young's modulus of the crystalline polymer material in that direction have a proportional relationship. In addition, a Young's modulus of the crystalline polymer material in a certain direction and a coefficient of thermal expansion of the crystalline polymer material in the certain direction have an inversely proportional relationship. In the present modification, a Young's modulus of the resin film 257 in the X-axis direction is, for example, 8 GPa. A Young's modulus of the resin film 257 in the Y-axis direction is, for example, 3 GPa. In addition, a coefficient of thermal expansion of the resin film 257 in the X-axis direction is, for example, 20 ppm/° C. A coefficient of thermal expansion of the resin film 257 in the Y-axis direction is, for example, 40 ppm/° C.

The resin coating film 258 is positioned between the resin film 257 and the resin lens array 24. The resin coating film 258 is so provided as to cover the resin film 257. A surface, of the resin coating film 258, on an opposite side to the resin film 257 is in contact with the resin lens array 24.

In the stereoscopic display apparatus 1F as the sixth modification, the main constituent material included in the resin lens array 24 and a main constituent material included in the resin coating film 258 are substantially the same. Specifically, the respective main constituent materials included in the resin lens array 24 and the resin coating film 258 are both, for example, a urethane-acrylic-based photo-curable resin.

The resin coating film 258 includes the multiple fourth particles P4. A ratio of a volume of all of the fourth particles P4 present in the resin coating film 258 to a volume of the resin coating film 258 is lower than the ratio of the volume of all of the first particles P1 present in the resin lens array 24. Specifically, the ratio of the volume of all of the first particles P1 to the volume of the resin lens array 24 is, for example, higher than or equal to 40 vol % and lower than or equal to 90 vol %, and is, for example, 60 vol %. The ratio of the volume of all of the fourth particles P4 to the volume of the resin coating film 258 is, for example, 45 vol %.

The coefficient of thermal expansion of the resin lens array 24 in the X-axis direction is, for example, 7 ppm/° C. The coefficient of thermal expansion of the resin lens array 24 in the Y-axis direction is, for example, also 7 ppm/° C. A coefficient of thermal expansion of the resin coating film 258 in the X-axis direction is, for example, 15 ppm/° C. A coefficient of thermal expansion of the resin coating film 258 in the Y-axis direction is, for example, also 15 ppm/° C.

In the stereoscopic display apparatus 1F as the sixth modification, the resin film 257 including the crystalline polymer material is used. Therefore, it is possible to provide the lens array sheet 23F with directivity. Accordingly, for example, in a case where a dimension of the lens array sheet 23F in the X-axis direction is greater than a dimension of the lens array sheet 23F in the Y-axis direction, a coefficient of thermal expansion of the lens array sheet 23F in the X-axis direction is allowed to be lower than a coefficient of thermal expansion of the lens array sheet 23F in the Y-axis direction. Accordingly, it is possible to reduce a difference in amount between expansion in the X-axis direction and expansion in the Y-axis direction accompanying a change in the temperature environment. As a result, it is possible to more effectively prevent occurrence of warpage of the lens array unit 20F, occurrence of falling off of the lens array sheet 23F from the glass substrate 12, or the like, that accompanies a change in the temperature environment.

Note that in the present modification, polyethylene naphthalate (PEN) is described as an example of the crystalline polymer material included in the resin film 257. However, the present disclosure is not limited thereto. For example, another crystalline polymer material such as polyethylene terephthalate (PET) may be used. As compared with polyethylene naphthalate, polyethylene terephthalate makes it possible to widen an adjustment margin of the Young's modulus in the XY plane, i.e., an adjustable range of the Young's modulus in the XY plane. Note that the Young's modulus of the resin film 257 is preferably, for example, greater than or equal to 3 GPa and less than or equal to 8 GPa. In such a case, the coefficient of thermal expansion of the resin film 257 is, for example, higher than or equal to 20 ppm/° C. and lower than or equal to 75 ppm/° C.

Usually, a stereoscopic display apparatus is so installed that a dimension of its screen in a horizontal direction is greater than a dimension of the screen in a vertical direction. Therefore, it is desirable to set the Young's modulus in the X-axis direction to be greater than the Young's modulus in the Y-axis direction, and to so install the stereoscopic display apparatus 1F that the X-axis direction matches the horizontal direction and the Y-axis direction matches the vertical direction. A reason for this is that this allows the coefficient of thermal expansion of the buffer layer 25F in the X-axis direction to be relatively low, and allows the coefficient of thermal expansion of the buffer layer 25F in the Y-axis direction to be relatively high. As a result, it is possible to more effectively prevent occurrence of warpage of the lens array unit 20F, occurrence of falling off of the lens array sheet 23F from the glass substrate 12, or the like, that accompanies a change in the temperature environment, as described above. A ratio between the Young's modulus in the horizontal direction (the X-axis direction) and the Young's modulus in the vertical direction (the Y-axis direction) is preferably, for example, 7:3, 6.5:3.5, or 6:4.

In addition, in the stereoscopic display apparatus 1F as the sixth modification, the description has been given, as an example, of the case where the main constituent material included in the resin lens array 24 and the main constituent material included in the resin coating film 258 are substantially the same. However, the present modification is not limited thereto. For example, the main constituent material included in the resin lens array 24 and the main constituent material included in the resin coating film 258 may be different.

3. Example of Practical Application to Endoscopic Surgery System

The technology according to the present disclosure is practically applicable to various products. For example, the technology according to the present disclosure may be applied to an endoscopic surgery system.

FIG. 9 is a view depicting an example of a schematic configuration of an endoscopic surgery system 5000 to which the technology according to an embodiment of the present disclosure can be applied. In FIG. 9, a state is illustrated in which a surgeon (medical doctor) 5067 is using the endoscopic surgery system 5000 to perform surgery for a patient 5071 on a patient bed 5069. As depicted, the endoscopic surgery system 5000 includes an endoscope 5001, other surgical tools 5017, a supporting arm apparatus 5027 which supports the endoscope 5001 thereon, and a cart 5037 on which various apparatus for endoscopic surgery are mounted.

In endoscopic surgery, in place of incision of the abdominal wall to perform laparotomy, a plurality of tubular aperture devices called trocars 5025a to 5025d are used to puncture the abdominal wall. Then, a lens barrel 5003 of the endoscope 5001 and the other surgical tools 5017 are inserted into body cavity of the patient 5071 through the trocars 5025a to 5025d. In the example depicted, as the other surgical tools 5017, a pneumoperitoneum tube 5019, an energy device 5021 and forceps 5023 are inserted into body cavity of the patient 5071. Further, the energy device 5021 is a treatment tool for performing incision and peeling of a tissue, sealing of a blood vessel or the like by high frequency current or ultrasonic vibration. However, the surgical tools 5017 depicted are mere examples at all, and as the surgical tools 5017, various surgical tools which are generally used in endoscopic surgery such as, for example, tweezers or a retractor may be used.

An image of a surgical region in a body cavity of the patient 5071 imaged by the endoscope 5001 is displayed on a display apparatus 5041. The surgeon 5067 would use the energy device 5021 or the forceps 5023 while watching the image of the surgical region displayed on the display apparatus 5041 on the real time basis to perform such treatment as, for example, resection of an affected area. It is to be noted that, though not depicted, the pneumoperitoneum tube 5019, the energy device 5021 and the forceps 5023 are supported by the surgeon 5067, an assistant or the like during surgery.

(Supporting Arm Apparatus)

The supporting arm apparatus 5027 includes an arm unit 5031 extending from a base unit 5029. In the example depicted, the arm unit 5031 includes joint portions 5033a, 5033b and 5033c and links 5035a and 5035b and is driven under the control of an arm controlling apparatus 5045. The endoscope 5001 is supported by the arm unit 5031 such that the position and the posture of the endoscope 5001 are controlled. Consequently, stable fixation in position of the endoscope 5001 can be implemented.

(Endoscope)

The endoscope 5001 includes the lens barrel 5003 which has a region of a predetermined length from a distal end thereof to be inserted into a body cavity of the patient 5071, and a camera head 5005 connected to a proximal end of the lens barrel 5003. In the example depicted, the endoscope 5001 is depicted as a rigid endoscope having the lens barrel 5003 of the hard type. However, the endoscope 5001 may otherwise be configured as a flexible endoscope having the lens barrel 5003 of the flexible type.

The lens barrel 5003 has, at a distal end thereof, an opening in which an objective lens is fitted. A light source apparatus 5043 is connected to the endoscope 5001 such that light generated by the light source apparatus 5043 is introduced to a distal end of the lens barrel by a light guide extending in the inside of the lens barrel 5003 and is irradiated toward an observation target in a body cavity of the patient 5071 through the objective lens. It is to be noted that the endoscope 5001 may be a forward-viewing endoscope or may be an oblique-viewing endoscope or a side-viewing endoscope.

An optical system and an image pickup element are provided in the inside of the camera head 5005 such that reflected light (observation light) from an observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 5039. It is to be noted that the camera head 5005 has a function incorporated therein for suitably driving the optical system of the camera head 5005 to adjust the magnification and the focal distance.

It is to be noted that, in order to establish compatibility with, for example, a stereoscopic vision (three dimensional (3D) display), a plurality of image pickup elements may be provided on the camera head 5005. In this case, a plurality of relay optical systems are provided in the inside of the lens barrel 5003 in order to guide observation light to each of the plurality of image pickup elements.

(Various Apparatus Incorporated in Cart)

The CCU 5039 includes a central processing unit (CPU), a graphics processing unit (GPU) or the like and integrally controls operation of the endoscope 5001 and the display apparatus 5041. In particular, the CCU 5039 performs, for an image signal received from the camera head 5005, various image processes for displaying an image based on the image signal such as, for example, a development process (demosaic process). The CCU 5039 provides the image signal for which the image processes have been performed to the display apparatus 5041. Further, the CCU 5039 transmits a control signal to the camera head 5005 to control driving of the camera head 5005. The control signal may include information relating to an image pickup condition such as a magnification or a focal distance.

The display apparatus 5041 displays an image based on an image signal for which the image processes have been performed by the CCU 5039 under the control of the CCU 5039. If the endoscope 5001 is ready for imaging of a high resolution such as 4K (horizontal pixel number 3840× vertical pixel number 2160), 8K (horizontal pixel number 7680×vertical pixel number 4320) or the like and/or ready for 3D display, then a display apparatus by which corresponding display of the high resolution and/or 3D display are possible may be used as the display apparatus 5041. Where the apparatus is ready for imaging of a high resolution such as 4K or 8K, if the display apparatus used as the display apparatus 5041 has a size of equal to or not less than 55 inches, then a more immersive experience can be obtained. Further, a plurality of display apparatus 5041 having different resolutions and/or different sizes may be provided in accordance with purposes.

The light source apparatus 5043 includes a light source such as, for example, a light emitting diode (LED) and supplies irradiation light for imaging of a surgical region to the endoscope 5001.

The arm controlling apparatus 5045 includes a processor such as, for example, a CPU and operates in accordance with a predetermined program to control driving of the arm unit 5031 of the supporting arm apparatus 5027 in accordance with a predetermined controlling method.

An inputting apparatus 5047 is an input interface for the endoscopic surgery system 5000. A user can perform inputting of various kinds of information or instruction inputting to the endoscopic surgery system 5000 through the inputting apparatus 5047. For example, the user would input various kinds of information relating to surgery such as physical information of a patient, information regarding a surgical procedure of the surgery and so forth through the inputting apparatus 5047. Further, the user would input, for example, an instruction to drive the arm unit 5031, an instruction to change an image pickup condition (type of irradiation light, magnification, focal distance or the like) by the endoscope 5001, an instruction to drive the energy device 5021 or the like through the inputting apparatus 5047.

The type of the inputting apparatus 5047 is not limited and may be that of any one of various known inputting apparatus. As the inputting apparatus 5047, for example, a mouse, a keyboard, a touch panel, a switch, a foot switch 5057 and/or a lever or the like may be applied. Where a touch panel is used as the inputting apparatus 5047, it may be provided on the display face of the display apparatus 5041.

Otherwise, the inputting apparatus 5047 is a device to be mounted on a user such as, for example, a glasses type wearable device or a head mounted display (HMD), and various kinds of inputting are performed in response to a gesture or a line of sight of the user detected by any of the devices mentioned. Further, the inputting apparatus 5047 includes a camera which can detect a motion of a user, and various kinds of inputting are performed in response to a gesture or a line of sight of a user detected from a video imaged by the camera. Further, the inputting apparatus 5047 includes a microphone which can collect the voice of a user, and various kinds of inputting are performed by voice collected by the microphone. By configuring the inputting apparatus 5047 such that various kinds of information can be inputted in a contactless fashion in this manner, especially a user who belongs to a clean area (for example, the surgeon 5067) can operate an apparatus belonging to an unclean area in a contactless fashion. Further, since the user can operate an apparatus without releasing a possessed surgical tool from its hand, the convenience to the user is improved.

A treatment tool controlling apparatus 5049 controls driving of the energy device 5021 for cautery or incision of a tissue, sealing of a blood vessel or the like. A pneumoperitoneum apparatus 5051 feeds gas into a body cavity of the patient 5071 through the pneumoperitoneum tube 5019 to inflate the body cavity in order to secure the field of view of the endoscope 5001 and secure the working space for the surgeon. A recorder 5053 is an apparatus capable of recording various kinds of information relating to surgery. A printer 5055 is an apparatus capable of printing various kinds of information relating to surgery in various forms such as a text, an image or a graph.

In the following, especially a characteristic configuration of the endoscopic surgery system 5000 is described in more detail.

(Supporting Arm Apparatus)

The supporting arm apparatus 5027 includes the base unit 5029 serving as a base, and the arm unit 5031 extending from the base unit 5029. In the example depicted, the arm unit 5031 includes the plurality of joint portions 5033a, 5033b and 5033c and the plurality of links 5035a and 5035b connected to each other by the joint portion 5033b. In FIG. 9, for simplified illustration, the configuration of the arm unit 5031 is depicted in a simplified form. Actually, the shape, number and arrangement of the joint portions 5033a to 5033c and the links 5035a and 5035b and the direction and so forth of axes of rotation of the joint portions 5033a to 5033c can be set suitably such that the arm unit 5031 has a desired degree of freedom. For example, the arm unit 5031 may preferably be configured such that it has a degree of freedom equal to or not less than 6 degrees of freedom. This makes it possible to move the endoscope 5001 freely within the movable range of the arm unit 5031. Consequently, it becomes possible to insert the lens barrel 5003 of the endoscope 5001 from a desired direction into a body cavity of the patient 5071.

An actuator is provided in each of the joint portions 5033a to 5033c, and the joint portions 5033a to 5033c are configured such that they are rotatable around predetermined axes of rotation thereof by driving of the respective actuators. The driving of the actuators is controlled by the arm controlling apparatus 5045 to control the rotational angle of each of the joint portions 5033a to 5033c thereby to control driving of the arm unit 5031. Consequently, control of the position and the posture of the endoscope 5001 can be implemented. Thereupon, the arm controlling apparatus 5045 can control driving of the arm unit 5031 by various known controlling methods such as force control or position control.

For example, if the surgeon 5067 suitably performs operation inputting through the inputting apparatus 5047 (including the foot switch 5057), then driving of the arm unit 5031 may be controlled suitably by the arm controlling apparatus 5045 in response to the operation input to control the position and the posture of the endoscope 5001. After the endoscope 5001 at the distal end of the arm unit 5031 is moved from an arbitrary position to a different arbitrary position by the control just described, the endoscope 5001 can be supported fixedly at the position after the movement. It is to be noted that the arm unit 5031 may be operated in a master-slave fashion. In this case, the arm unit 5031 may be remotely controlled by the user through the inputting apparatus 5047 which is placed at a place remote from the operating room.

Further, where force control is applied, the arm controlling apparatus 5045 may perform power-assisted control to drive the actuators of the joint portions 5033a to 5033c such that the arm unit 5031 may receive external force by the user and move smoothly following the external force. This makes it possible to move, when the user directly touches with and moves the arm unit 5031, the arm unit 5031 with comparatively weak force. Accordingly, it becomes possible for the user to move the endoscope 5001 more intuitively by a simpler and easier operation, and the convenience to the user can be improved.

Here, generally in endoscopic surgery, the endoscope 5001 is supported by a medical doctor called scopist. In contrast, where the supporting arm apparatus 5027 is used, the position of the endoscope 5001 can be fixed more certainly without hands, and therefore, an image of a surgical region can be obtained stably and surgery can be performed smoothly.

It is to be noted that the arm controlling apparatus 5045 may not necessarily be provided on the cart 5037. Further, the arm controlling apparatus 5045 may not necessarily be a single apparatus. For example, the arm controlling apparatus 5045 may be provided in each of the joint portions 5033a to 5033c of the arm unit 5031 of the supporting arm apparatus 5027 such that the plurality of arm controlling apparatus 5045 cooperate with each other to implement driving control of the arm unit 5031.

(Light Source Apparatus)

The light source apparatus 5043 supplies irradiation light upon imaging of a surgical region to the endoscope 5001. The light source apparatus 5043 includes a white light source which includes, for example, an LED, a laser light source or a combination of them. In this case, where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 5043. Further, in this case, if laser beams from the respective RGB laser light sources are irradiated time-divisionally on an observation target and driving of the image pickup elements of the camera head 5005 is controlled in synchronism with the irradiation timings, then images individually corresponding to the R, G and B colors can be picked up time-divisionally. According to the method just described, a color image can be obtained even if a color filter is not provided for the image pickup element.

Further, driving of the light source apparatus 5043 may be controlled such that the intensity of light to be outputted is changed for each predetermined time. By controlling driving of the image pickup element of the camera head 5005 in synchronism with the timing of the change of the intensity of light to acquire images time-divisionally and synthesizing the images, an image of a high dynamic range free from underexposed blocked up shadows and overexposed highlights can be created.

Further, the light source apparatus 5043 may be configured to supply light of a predetermined wavelength band ready for special light observation. In special light observation, for example, by utilizing the wavelength dependency of absorption of light in a body tissue to irradiate light of a narrower wavelength band in comparison with irradiation light upon ordinary observation (namely, white light), narrow band light observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 5043 can be configured to supply such narrow-band light and/or excitation light suitable for special light observation as described above.

(Camera Head and CCU)

Functions of the camera head 5005 of the endoscope 5001 and the CCU 5039 are described in more detail with reference to FIG. 10. FIG. 10 is a block diagram depicting an example of a functional configuration of the camera head 5005 and the CCU 5039 depicted in FIG. 9.

Referring to FIG. 10, the camera head 5005 has, as functions thereof, a lens unit 5007, an image pickup unit 5009, a driving unit 5011, a communication unit 5013 and a camera head controlling unit 5015. Further, the CCU 5039 has, as functions thereof, a communication unit 5059, an image processing unit 5061 and a control unit 5063. The camera head 5005 and the CCU 5039 are connected to be bidirectionally communicable to each other by a transmission cable 5065.

First, a functional configuration of the camera head 5005 is described. The lens unit 5007 is an optical system provided at a connecting location of the camera head 5005 to the lens barrel 5003. Observation light taken in from a distal end of the lens barrel 5003 is introduced into the camera head 5005 and enters the lens unit 5007. The lens unit 5007 includes a combination of a plurality of lenses including a zoom lens and a focusing lens. The lens unit 5007 has optical properties adjusted such that the observation light is condensed on a light receiving face of the image pickup element of the image pickup unit 5009. Further, the zoom lens and the focusing lens are configured such that the positions thereof on their optical axis are movable for adjustment of the magnification and the focal point of a picked up image.

The image pickup unit 5009 includes an image pickup element and disposed at a succeeding stage to the lens unit 5007. Observation light having passed through the lens unit 5007 is condensed on the light receiving face of the image pickup element, and an image signal corresponding to the observation image is generated by photoelectric conversion of the image pickup element. The image signal generated by the image pickup unit 5009 is provided to the communication unit 5013.

As the image pickup element which is included by the image pickup unit 5009, an image sensor, for example, of the complementary metal oxide semiconductor (CMOS) type is used which has a Bayer array and is capable of picking up an image in color. It is to be noted that, as the image pickup element, an image pickup element may be used which is ready, for example, for imaging of an image of a high resolution equal to or not less than 4K. If an image of a surgical region is obtained in a high resolution, then the surgeon 5067 can comprehend a state of the surgical region in enhanced details and can proceed with the surgery more smoothly.

Further, the image pickup element which is included by the image pickup unit 5009 includes such that it has a pair of image pickup elements for acquiring image signals for the right eye and the left eye compatible with 3D display. Where 3D display is applied, the surgeon 5067 can comprehend the depth of a living body tissue in the surgical region more accurately. It is to be noted that, if the image pickup unit 5009 is configured as that of the multi-plate type, then a plurality of systems of lens units 5007 are provided corresponding to the individual image pickup elements of the image pickup unit 5009.

The image pickup unit 5009 may not necessarily be provided on the camera head 5005. For example, the image pickup unit 5009 may be provided just behind the objective lens in the inside of the lens barrel 5003.

The driving unit 5011 includes an actuator and moves the zoom lens and the focusing lens of the lens unit 5007 by a predetermined distance along the optical axis under the control of the camera head controlling unit 5015. Consequently, the magnification and the focal point of a picked up image by the image pickup unit 5009 can be adjusted suitably.

The communication unit 5013 includes a communication apparatus for transmitting and receiving various kinds of information to and from the CCU 5039. The communication unit 5013 transmits an image signal acquired from the image pickup unit 5009 as RAW data to the CCU 5039 through the transmission cable 5065. Thereupon, in order to display a picked up image of a surgical region in low latency, preferably the image signal is transmitted by optical communication. This is because, upon surgery, the surgeon 5067 performs surgery while observing the state of an affected area through a picked up image, it is demanded for a moving image of the surgical region to be displayed on the real time basis as far as possible in order to achieve surgery with a higher degree of safety and certainty. Where optical communication is applied, a photoelectric conversion module for converting an electric signal into an optical signal is provided in the communication unit 5013. After the image signal is converted into an optical signal by the photoelectric conversion module, it is transmitted to the CCU 5039 through the transmission cable 5065.

Further, the communication unit 5013 receives a control signal for controlling driving of the camera head 5005 from the CCU 5039. The control signal includes information relating to image pickup conditions such as, for example, information that a frame rate of a picked up image is designated, information that an exposure value upon image picking up is designated and/or information that a magnification and a focal point of a picked up image are designated. The communication unit 5013 provides the received control signal to the camera head controlling unit 5015. It is to be noted that also the control signal from the CCU 5039 may be transmitted by optical communication. In this case, a photoelectric conversion module for converting an optical signal into an electric signal is provided in the communication unit 5013. After the control signal is converted into an electric signal by the photoelectric conversion module, it is provided to the camera head controlling unit 5015.

It is to be noted that the image pickup conditions such as the frame rate, exposure value, magnification or focal point are set automatically by the control unit 5063 of the CCU 5039 on the basis of an acquired image signal. In other words, an auto exposure (AE) function, an auto focus (AF)

function and an auto white balance (AWB) function are incorporated in the endoscope 5001.

The camera head controlling unit 5015 controls driving of the camera head 5005 on the basis of a control signal from the CCU 5039 received through the communication unit 5013. For example, the camera head controlling unit 5015 controls driving of the image pickup element of the image pickup unit 5009 on the basis of information that a frame rate of a picked up image is designated and/or information that an exposure value upon image picking up is designated. Further, for example, the camera head controlling unit 5015 controls the driving unit 5011 to suitably move the zoom lens and the focus lens of the lens unit 5007 on the basis of information that a magnification and a focal point of a picked up image are designated. The camera head controlling unit 5015 may further include a function for storing information for identifying the lens barrel 5003 and/or the camera head 5005.

It is to be noted that, by disposing the components such as the lens unit 5007 and the image pickup unit 5009 in a sealed structure having high airtightness and waterproof, the camera head 5005 can be provided with resistance to an autoclave sterilization process.

Now, a functional configuration of the CCU 5039 is described. The communication unit 5059 includes a communication apparatus for transmitting and receiving various kinds of information to and from the camera head 5005. The communication unit 5059 receives an image signal transmitted thereto from the camera head 5005 through the transmission cable 5065. Thereupon, the image signal may be transmitted preferably by optical communication as described above. In this case, for the compatibility with optical communication, the communication unit 5059 includes a photoelectric conversion module for converting an optical signal into an electric signal. The communication unit 5059 provides the image signal after conversion into an electric signal to the image processing unit 5061.

Further, the communication unit 5059 transmits, to the camera head 5005, a control signal for controlling driving of the camera head 5005. The control signal may also be transmitted by optical communication.

The image processing unit 5061 performs various image processes for an image signal in the form of RAW data transmitted thereto from the camera head 5005. The image processes include various known signal processes such as, for example, a development process, an image quality improving process (a bandwidth enhancement process, a super-resolution process, a noise reduction (NR) process and/or an image stabilization process) and/or an enlargement process (electronic zooming process). Further, the image processing unit 5061 performs a detection process for an image signal in order to perform AE, AF and AWB.

The image processing unit 5061 includes a processor such as a CPU or a GPU, and when the processor operates in accordance with a predetermined program, the image processes and the detection process described above can be performed. It is to be noted that, where the image processing unit 5061 includes a plurality of GPUs, the image processing unit 5061 suitably divides information relating to an image signal such that image processes are performed in parallel by the plurality of GPUs.

The control unit 5063 performs various kinds of control relating to image picking up of a surgical region by the endoscope 5001 and display of the picked up image. For example, the control unit 5063 generates a control signal for controlling driving of the camera head 5005. Thereupon, if image pickup conditions are inputted by the user, then the control unit 5063 generates a control signal on the basis of the input by the user. Alternatively, where the endoscope 5001 has an AE function, an AF function and an AWB function incorporated therein, the control unit 5063 suitably calculates an optimum exposure value, focal distance and white balance in response to a result of a detection process by the image processing unit 5061 and generates a control signal.

Further, the control unit 5063 controls the display apparatus 5041 to display an image of a surgical region on the basis of an image signal for which image processes have been performed by the image processing unit 5061. Thereupon, the control unit 5063 recognizes various objects in the surgical region image using various image recognition technologies. For example, the control unit 5063 can recognize a surgical tool such as forceps, a particular living body region, bleeding, mist when the energy device 5021 is used and so forth by detecting the shape, color and so forth of edges of the objects included in the surgical region image. The control unit 5063 causes, when it controls the display unit 5041 to display a surgical region image, various kinds of surgery supporting information to be displayed in an overlapping manner with an image of the surgical region using a result of the recognition. Where surgery supporting information is displayed in an overlapping manner and presented to the surgeon 5067, the surgeon 5067 can proceed with the surgery more safety and certainty.

The transmission cable 5065 which connects the camera head 5005 and the CCU 5039 to each other is an electric signal cable ready for communication of an electric signal, an optical fiber ready for optical communication or a composite cable ready for both of electrical and optical communication.

Here, while, in the example depicted, communication is performed by wired communication using the transmission cable 5065, the communication between the camera head 5005 and the CCU 5039 may be performed otherwise by wireless communication. Where the communication between the camera head 5005 and the CCU 5039 is performed by wireless communication, there is no necessity to lay the transmission cable 5065 in the operating room. Therefore, such a situation that movement of medical staff in the operating room is disturbed by the transmission cable 5065 can be eliminated.

An example of the endoscopic surgery system 5000 to which the technology according to an embodiment of the present disclosure can be applied has been described above. It is to be noted here that, although the endoscopic surgery system 5000 has been described as an example, the system to which the technology according to an embodiment of the present disclosure can be applied is not limited to the example. For example, the technology according to an embodiment of the present disclosure may be applied to a flexible endoscopic system for inspection or a microscopic surgery system.

The technology according to the present disclosure is favorably applicable to the display apparatus 5041 in the configuration described above. Application of the technology according to the present disclosure to the display apparatus 5041 allows for obtainment of a clearer image of the surgical region, thus making it possible to perform a surgery more safely and more reliably.

4. Example of Practical Application to Mobile Body Control System

The technology according to the present disclosure is practically applicable to various products. For example, the technology according to the present disclosure may be achieved as an apparatus to be mounted on a mobile body of any kind among an automobile, an electric vehicle, a hybrid electric vehicle, a motorcycle, a bicycle, a personal mobility, an airplane, a drone, a vessel, a robot, a construction machine, an agricultural machine (tractor), and the like.

FIG. 11 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 11, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 11 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 12 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 12 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 11, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automated driving, which makes the vehicle to travel automatedly without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 11, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 11 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

An example of the vehicle control system to which the technology according to the present disclosure is applicable has been described above. The technology according to the present disclosure is applicable, for example, to the display section 7720 in the configuration described above. Application of the technology according to the present disclosure to the display section 7720 allows the image display to be viewed more easily, thus allowing for more accurate image recognition.

5. Other Modifications

Although the present disclosure has been described above referring to some embodiments and modifications, and application examples or practical application examples thereof (hereinafter, referred to as the embodiments and the like), the present disclosure is not limited to the embodiments and the like described above, and various modifications may be made. For example, in the embodiments and the like described above, the case where the resin lens array is a lenticular lens including multiple cylindrical lenses arranged in one-dimensional direction has been described as an example; however, the present disclosure is not limited thereto. For example, the resin lens array may include multiple lenses arranged two-dimensionally.

In addition, the various materials described in the embodiments and the like above are examples, and the present disclosure is not limited thereto.

A lens array unit according to an embodiment of the present disclosure includes a stacked structure. The stacked structure includes a resin lens array and a buffer layer. The resin lens array has a first coefficient of thermal expansion within a first range that includes a coefficient of thermal expansion of glass. The buffer layer has a second coefficient of thermal expansion higher than the first coefficient of thermal expansion. Therefore, according to the stereoscopic display apparatus including the lens array unit, it is possible to exhibit high display performance even in a case where a temperature environment changes.

It is to be noted that the effects described herein are mere examples and the description thereof is non-limiting. Other effects may be also achieved. In addition, the present technology may have any of the following configurations.

(1)

A lens array unit including a stacked structure including a resin lens array having a first coefficient of thermal expansion within a first range that includes a coefficient of thermal expansion of glass, and a buffer layer having a second coefficient of thermal expansion higher than the first coefficient of thermal expansion.

(2)

The lens array unit according to (1) described above, in which the first coefficient of thermal expansion is higher than or equal to 6 ppm/° C. and lower than or equal to 20 ppm/° C.

(3)

The lens array unit according to (1) or (2) described above, in which the second coefficient of thermal expansion is higher than or equal to 40 ppm/° C. and lower than or equal to 75 ppm/° C.

(4)

The lens array unit according to any one of (1) to (3) described above, further including a resin polarizer that is positioned on an opposite side to the resin lens array as viewed from the buffer layer.

(5)

The lens array unit according to (4) described above, in which the lens array unit is provided on a glass substrate, the glass substrate including the glass and being positioned on an opposite side to the resin lens array as viewed from the resin polarizer.

(6)

The lens array unit according to any one of (1) to (5) described above, in which the resin lens array includes multiple first particles including a first inorganic material, and the buffer layer includes multiple second particles including a second inorganic material.

(7)

The lens array unit according to (6) described above, in which a ratio of a volume of the multiple first particles to a volume of the resin lens array is higher than a ratio of a volume of the multiple second particles to a volume of the buffer layer.

(8)

The lens array unit according to (6) described above, in which the buffer layer includes a first level layer part and a second level layer part, the second level layer part being positioned between the first level layer part and the resin lens array, and a ratio of a volume of the multiple second particles present in the second level layer part to a volume of the second level layer part is higher than a ratio of a volume of the multiple second particles present in the first level layer part to a volume of the first level layer part.

(9)

The lens array unit according to any one of (1) to (8) described above, in which the buffer layer includes a resin film that expands in each of a first direction and a second direction, and a resin coating film that is provided to cover the resin film and expands in each of the first direction and the second direction.

(10)

The lens array unit according to (9) described above, in which the resin film includes a crystalline polymer, the first direction includes a longitudinal direction of the resin film, the second direction includes a short-side direction of the resin film, and a Young's modulus of the resin film in the longitudinal direction is higher than a Young's modulus of the resin film in the short-side direction.

(11)

A stereoscopic display apparatus including:

a display panel including a display surface in which multiple display pixels are arranged; and a lens array unit disposed to be opposed to the display surface of the display panel, in which the lens array unit includes a stacked structure including a resin lens array having a first coefficient of thermal expansion within a first range that includes a coefficient of thermal expansion of glass, and a buffer layer having a second coefficient of thermal expansion higher than the first coefficient of thermal expansion.

This application claims the priority on the basis of Japanese Patent Application No. 2021-12441 filed on Jan. 28, 2021 with Japan Patent Office, the entire contents of which are incorporated in this application by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A lens array unit, comprising:

a stacked structure including a resin lens array having a first coefficient of thermal expansion within a first range, wherein the first range includes a coefficient of thermal expansion of glass, and a buffer layer having a second coefficient of the thermal expansion higher than the first coefficient of the thermal expansion, wherein the buffer layer includes:

a resin film that expands in each of a first direction and a second direction, and a resin coating film that covers the resin film and expands in the each of the first direction and the second direction.

2. The lens array unit according to claim 1, wherein the first coefficient of the thermal expansion is higher than or equal to 6 ppm/° C. and lower than or equal to 20 ppm/° C.

3. The lens array unit according to claim 1, wherein the second coefficient of the thermal expansion is higher than or equal to 40 ppm/° C. and lower than or equal to 75 ppm/° C.

4. The lens array unit according to claim 1, further comprising a resin polarizer that is on an opposite side to the resin lens array as viewed from the buffer layer.

5. The lens array unit according to claim 4, wherein the lens array unit is on a glass substrate, the glass substrate includes the glass, and the glass substrate is on an opposite side to the resin lens array as viewed from the resin polarizer.

6. The lens array unit according to claim 1, wherein the resin lens array includes a plurality of first particles, the plurality of first particles includes a first inorganic material, the buffer layer includes a plurality of second particles, and the plurality of second particles includes a second inorganic material.

7. The lens array unit according to claim 6, wherein a ratio of a volume of the plurality of first particles to a volume of the resin lens array is higher than a ratio of a volume of the plurality of second particles to a volume of the buffer layer.

8. The lens array unit according to claim 6, wherein the buffer layer includes a first level layer part and a second level layer part, the second level layer part is between the first level layer part and the resin lens array, and a ratio of a volume of the plurality of second particles present in the second level layer part to a volume of the second level layer part is higher than a ratio of a volume of the plurality of second particles present in the first level layer part to a volume of the first level layer part.

9. The lens array unit according to claim 1, wherein the resin film includes a crystalline polymer, the first direction includes a longitudinal direction of the resin film, the second direction includes a short-side direction of the resin film, and a Young's modulus of the resin film in the longitudinal direction is higher than a Young's modulus of the resin film in the short-side direction.

10. A stereoscopic display apparatus, comprising:
a display panel including a display surface, wherein a plurality of display pixels is on the display surface; and
a lens array unit is on an opposite side of the display surface of the display panel, wherein the lens array unit includes;
a stacked structure including
    a resin lens array having a first coefficient of thermal expansion within a first range, wherein
        the first range includes a coefficient of thermal expansion of glass, and
    a buffer layer having a second coefficient of the thermal expansion higher than the first coefficient of the thermal expansion, wherein the buffer layer includes:
        a resin film that expands in each of a first direction and a second direction, and
        a resin coating film that covers the resin film and expands in the each of the first direction and the second direction.

* * * * *